United States Patent
Barbieri et al.

(10) Patent No.: US 8,948,085 B2
(45) Date of Patent: Feb. 3, 2015

(54) METHODS AND APPARATUS FOR BEST-EFFORT RADIO BACKHAUL AMONG CELLS ON UNLICENSED OR SHARED SPECTRUM

(75) Inventors: Alan Barbieri, San Diego, CA (US); Naga Bhushan, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 13/049,773

(22) Filed: Mar. 16, 2011

(65) Prior Publication Data

US 2012/0063383 A1 Mar. 15, 2012

Related U.S. Application Data

(60) Provisional application No. 61/314,940, filed on Mar. 17, 2010.

(51) Int. Cl.
| | |
|---|---|
| *H04W 4/00* | (2009.01) |
| *H04W 72/08* | (2009.01) |
| *H04B 7/02* | (2006.01) |
| *H04W 16/14* | (2009.01) |
| *H04W 92/20* | (2009.01) |
| *H04W 72/04* | (2009.01) |
| *H04W 84/04* | (2009.01) |

(52) U.S. Cl.
CPC .............. *H04W 72/082* (2013.01); *H04B 7/024* (2013.01); *H04W 16/14* (2013.01); *H04W 92/20* (2013.01); *H04W 72/0453* (2013.01); *H04W 84/047* (2013.01)
USPC .......................................... 370/328; 455/445

(58) Field of Classification Search
None
See application file for complete search history.

(56) References Cited

U.S. PATENT DOCUMENTS

| | | | |
|---|---|---|---|
| 7,321,571 B2 * | 1/2008 | Schnack et al. ............... | 370/320 |
| 7,366,120 B2 * | 4/2008 | Handforth et al. ............ | 370/310 |
| 7,835,272 B1 * | 11/2010 | Johnson et al. ............... | 370/228 |
| 8,094,610 B2 * | 1/2012 | Wang et al. ................... | 370/328 |
| 2006/0083186 A1 * | 4/2006 | Handforth et al. ............ | 370/310 |
| 2007/0253394 A1 * | 11/2007 | Horiguchi et al. ............ | 370/338 |
| 2008/0076406 A1 | 3/2008 | Chen et al. | |
| 2008/0232256 A1 | 9/2008 | Douglas et al. | |
| 2009/0111388 A1 * | 4/2009 | Chen ............................... | 455/70 |
| 2010/0034135 A1 | 2/2010 | Kim et al. | |

(Continued)

FOREIGN PATENT DOCUMENTS

| | | |
|---|---|---|
| CN | 101154991 A | 4/2008 |
| KR | 20100018453 A | 2/2010 |

OTHER PUBLICATIONS

Xiao Yu Wang, "Cognitive-Empowered Femtocells: An Intelligent Paradigm for a Robust and Efficient Media Access", Thesis presented to the University of Waterloo, Ontario, Canada, 2010.

(Continued)

*Primary Examiner* — Brian Roberts
(74) *Attorney, Agent, or Firm* — Liem T. Do

(57) ABSTRACT

Methods and apparatus for wireless communication are described. A first base station may provide first backhaul information using a shared channel to a second base station. The shared channel may be white space channels, Authorized Shared Multiuser (ASM) channels or an Instrumentation, Scientific, and Measurement (ISM) channels. The first base station may further provide second backhaul information using a legacy backhaul channel.

62 Claims, 15 Drawing Sheets

(56) References Cited

U.S. PATENT DOCUMENTS

| | | |
|---|---|---|
| 2010/0067604 A1* | 3/2010 | Bhadra et al. ............... 375/267 |
| 2010/0216478 A1 | 8/2010 | Buddhikot et al. |
| 2010/0246506 A1 | 9/2010 | Krishnaswamy |
| 2011/0028146 A1* | 2/2011 | Tammisetti ............... 455/426.1 |

OTHER PUBLICATIONS

Todd Mersch, "LTE Femtocell Roadmap from Concept to Reality" Wireless Design & Development, Advantage Business Media, Jan. 3, 2011, http://www.wirelessdesignmag.com/ShowPR.aspx?PUBCODE=055&ACCT=0031947&ISSUE=1002&RELTYPE=EMB&PRODCODE=Z0300&PRODLETT=B&CommonCount=0.

Jeffrey H. Reed, "The Future of Cognitive Radio", Virginia Tech., Presented at The University of Texas, Austin, Texas, Nov. 16, 2010. http://www.twsummit.com/agenda.html.

International Search Report and Written Opinion—PCT/US2011/028895, ISA/EPO—Jul. 6, 2011.

Fujitsu: "Different Types of DL CoMP Transmission for LTE-A", 3GPP TSG-RAN1 #58bis, Oct. 12, 2009, R1-094252, pp. 1-10.

Rysavy Research: "HSPA to LTE-Advanced: 3GPP Broadband Evolution to IMT-Advanced (4G), 3G_Americas," 3GPP, Sep. 2009, pp. 107-108.

Taiwan Search Report—TW100109198—TIPO—Jan. 23, 2014.

Gerami C., et al., "Backhauling in TV White Spaces", 2010 IEEE Global Telecommunications Conference (GLOBECOM 2010), U.S. A., IEEE, Dec. 6, 2010, pp. 1-6.

Mueck M., "ETSI Reconfigurable Radio Systems (RRS)", 3GPP TSG RAN Meeting #48 Presentation, U.S.A., ETSI, Jun. 1, 2010, 3GPP TSG RAN Meeting #48—RP-100601, pp. 1-13, <URL: www.3gpp.org/ftp/tsg_ran/TSG_RAN/TSGR_48/Docs/RP-100601.zip>.

* cited by examiner

METHODS AND APPARATUS FOR BEST-EFFORT RADIO BACKHAUL AMONG CELLS ON UNLICENSED OR SHARED SPECTRUM

CROSS-REFERENCE TO RELATED APPLICATION

The present application claims the benefit of priority under 35 U.S.C. §119(e) of U.S. Provisional Patent Application Ser. No. 61/314,940 entitled METHOD AND APPARATUS FOR BEST-EFFORT RADIO BACKHAUL AMONG CELLS ON UNLICENSED SPECTRUM, filed on Mar. 17, 2010, the content of which is hereby incorporated by reference herein in its entirety for all purposes.

FIELD

This application is directed generally to wireless communications systems. More particularly, but not exclusively, the application relates to methods and apparatus for providing backhaul communication signaling used unlicensed or shared spectrum in a communications system, such as in a cognitive LTE system.

BACKGROUND

Wireless communication systems are widely deployed to provide various types of communication content such as voice, data, video and the like, and deployments are likely to increase with introduction of new data oriented systems such as Long Term Evolution (LTE) systems. Wireless communications systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, LTE systems and other orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference caused by frequency selective fading, which is characterized by different amounts of attenuation across the system bandwidth.

Generally, a wireless multiple-access communication system can simultaneously support communication for multiple wireless terminals (also referred to as user equipments (UEs) or access terminals (ATs)). Each terminal communicates with one or more base stations (also referred to as access points (APs)) via transmissions on forward and reverse links. The forward link (also referred to as a downlink) refers to the communication link from the base stations to the terminals, and the reverse link (also referred to as an uplink) refers to the communication link from the terminals to the base stations. These communication links may be established via a single-in-single-out (SISO), single-in-multiple-out (SIMO), multiple-in-single-out (MISO) or a multiple-in-multiple-out (MIMO) system.

As the number of devices increases, the need for proper bandwidth utilization for data and control signaling on licensed as well as unlicensed or shared spectrum becomes more important. Moreover, with the introduction of semiautonomous base stations (e.g., femtonodes and piconodes) for managing small cells, such as femtocells and picocells, in systems such as LTE, avoiding interference with existing base stations, as well as allocation and management of various channels, such as unlicensed or shared channels, which may be white space channels, authorized shared multiuser (ASM) channels, instrumentation scientific and measurement (ISM) channels, or other shared channels may become increasingly important.

SUMMARY

This application relates to generally to methods and apparatus for providing backhaul communication signaling used shared spectrum and shared channels in a communications system.

For example, in one aspect the disclosure relates to a method for wireless communication. The method may include selecting a shared channel for use as a first backhaul channel between a first wireless node and a second wireless node. The method may further include sending, from the first wireless node, a first set of backhaul information on the first backhaul channel. The method may further include sending, from the first wireless node, a second set of backhaul information on a second backhaul channel established between the first wireless node and the second wireless node.

In another aspect, the disclosure relates to a method for wireless communication. The method may include receiving a first set of backhaul information provided by a first wireless node on a first backhaul channel, wherein the first backhaul channel is provided on a shared channel. The method may further include receiving a second set of backhaul information provided by the first wireless node on a second backhaul channel, wherein the second wireless backhaul channel is a legacy backhaul channel. The method may further include adjusting a transmission from a second wireless node based at least in part on the received first set of backhaul information.

In another aspect, the disclosure relates to a method for wireless communication. The method may include sending, from a first wireless node, first backhaul information on a first backhaul channel established between the first wireless node and a second wireless node. The method may further include receiving, at the first wireless node, backhaul transmission coordination information from the second wireless node. The method may further include sending, from the first wireless node, second backhaul information on a second backhaul channel established between the first wireless node and the second wireless node.

In another aspect, the disclosure relates to a method for wireless communication. The method may include selecting a shared channel for use between a base station and a relay node. The method may further include sending, from the first base station to the relay node, a first set of information on the shared channel. The method may further include sending, from the first base station to the relay node, a second set of information on a legacy wireless channel.

In another aspect, the disclosure relates to a method for wireless communication. The method may include receiving, at a relay node from a base station, information defining a shared channel to be used. The method may further include sending, from the relay node to the base station, a set of information on the shared channel.

In other aspects, the disclosure relates to computer program products including a computer-readable medium having instructions stored thereon, the instructions for causing a computer to perform the above-described methods.

In still other aspects, the disclosure relates to apparatuses configured to perform the above-described methods.

In other aspects, the disclosure relates to apparatuses including means for performing the above-described methods.

Various additional aspects, details, features, functions, implementations and embodiments are further described below in conjunction with the appended drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
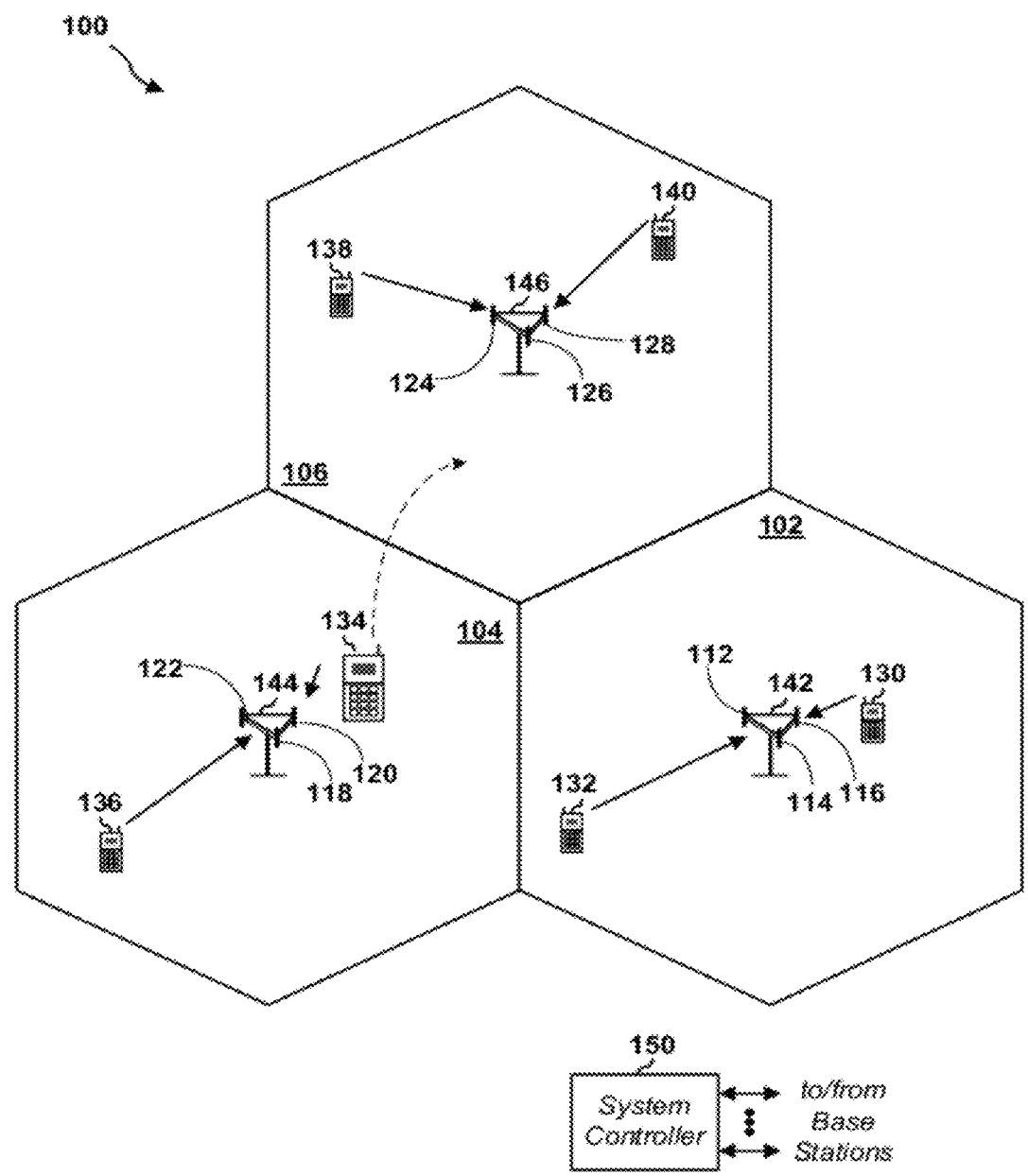
FIG. 1 illustrates a wireless communication system.

Various embodiments are described below with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

In various embodiments, the techniques and apparatus described herein may be used for wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, LTE networks, as well as other communications networks. As described herein, the terms "networks" and "systems" may be used interchangeably.

Various additional aspects and details are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect and/or embodiment described herein as "exemplary" is not necessarily to be construed as preferred or advantageous over other aspects and/or embodiments.

As used in this application, the terms "component," "module," "system," and the like are intended to refer to computer-related entities such as hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

A CDMA network may implement a radio technology such as Universal Terrestrial Radio Access (UTRA), cdma2000 and the like. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM and the like. UTRA, E-UTRA, and GSM are part of Universal Mobile Telecommunication System (UMTS). In particular, LTE is an upcoming release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed in the art. For example, 3GPP is a collaboration between groups of telecommunications associations that aims to define a globally applicable third generation mobile phone specification. 3GPP LTE is a 3GPP project aimed at improving the UMTS mobile phone standard. 3GPP may define specifications for the next generation of mobile networks, mobile systems, and mobile devices. For clarity, certain aspects of the apparatus and methods are described below for LTE implementations, and LTE terminology is used in much of the description below; however, the description is not intended to be limited to LTE. Accordingly, it will be apparent to one of skill in the art that the apparatus and methods described herein may be applied to various other communications systems and applications.

Single carrier frequency division multiple access (SC-FDMA) utilizes single carrier modulation and frequency domain equalization. SC-FDMA signal has lower peak-to-average power ratio (PAPR) because of its inherent single carrier structure. SC-FDMA has drawn great attention, especially in the uplink communications where lower PAPR greatly benefits the UE in terms of transmit power efficiency. It is used for uplink multiple access scheme in LTE.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels. The maximum spatial multiplexing $N_S$ if a linear receiver is used is min($N_T$, $N_R$), with each of the $N_S$ independent channels corresponding to a dimension. This provides an $N_S$ increase in spectral efficiency. A MIMO system can provide improved performance (e.g., higher throughput and/or greater reliability) if the additional dimensionalities created by the multiple transmit and receive antennas are utilized. The special dimension may be described in terms of a rank.

In LTE, time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot.

LTE supports scalable carrier bandwidths from 20 MHz down to 1.4 MHZ. In LTE, an RB is defined as 12 sub-carriers when the sub-carrier bandwidth is 15 kHz, or 24 sub-carriers when the sub-carrier bandwidth is 7.5 kHz. In an example implementation, in the time domain there is a defined radio frame that is 10 ms long and consists of 10 sub frames of 1 ms each. Every subframe consists of 2 slots, where each slot is 0.5 ms. The subcarrier spacing in the frequency domain in this case is 15 kHz. Twelve of these subcarriers together constitutes an RB, so in this implementation one resource block is 180 kHz. 6 Resource blocks fit in a carrier of 1.4 MHz and 100 resource blocks fit in a carrier of 20 MHz.

In LTE, a mobile station may be referred to as a UE. A UE can also be called a system, subscriber unit, subscriber station, mobile station, remote station, remote terminal, access terminal, wireless communication device, user agent, or user device. A UE can be a cellular telephone, a Session Initiation Protocol (SIP) phone, a wireless local loop (WLL) station, a personal digital assistant (PDA), a tablet, a handheld device having wireless connection capability, computing device, or other processing device connected to a wireless modem.

In LTE, a base station may be referred to as an evolved Node B (eNodeB or eNB). A base station can be utilized for communicating with UEs. A base station can also be referred to as an access point, base transceiver station or some other terminology. A semi-autonomous base station may be referred to as a home eNB or HeNB. A HeNB may thus be one example of an eNB. The HeNB and/or the coverage area of a HeNB may be referred to as a femtocell, a HeNB cell or a closed subscriber group (CSG) cell (where access is restricted).

Attention is now directed to FIG. 1, which illustrates an exemplary multiple access wireless communication system 100. The system 100 includes multiple cells, including cells 102, 104, and 106. In system 100, the cells 102, 104, and 106 may include a corresponding base station (also referred to as an eNB) 142, 144, and 146 respectively that may include multiple sectors. The multiple sectors can be formed by groups of antennas with each antenna responsible for communication with UEs in a portion of the cell. For example, in cell 102, antenna groups 112, 114, and 116 may each correspond to a different sector. In cell 104, antenna groups 118, 120, and 122 each correspond to a different sector. In cell 106, antenna groups 124, 126, and 128 each correspond to a different sector. Base stations 142, 144, and/or 146 may communicate with each other using backhaul connections such as S1 and/or X2 connections as defined in the LTE Specifications.

The cells 102, 104 and 106 can include several UEs, which can be in communication with one or more sectors of each cell 102, 104 or 106. For example, UEs 130 and 132 can be in communication with base station 142, UEs 134 and 136 can be in communication with base station 144, and UEs 138 and 140 can be in communication with base station 146. System 100 may include a system controller element 150 that may be used to facilitate communications between UEs and base stations and a core network (CN) function, and or between base stations.

Figure 2:
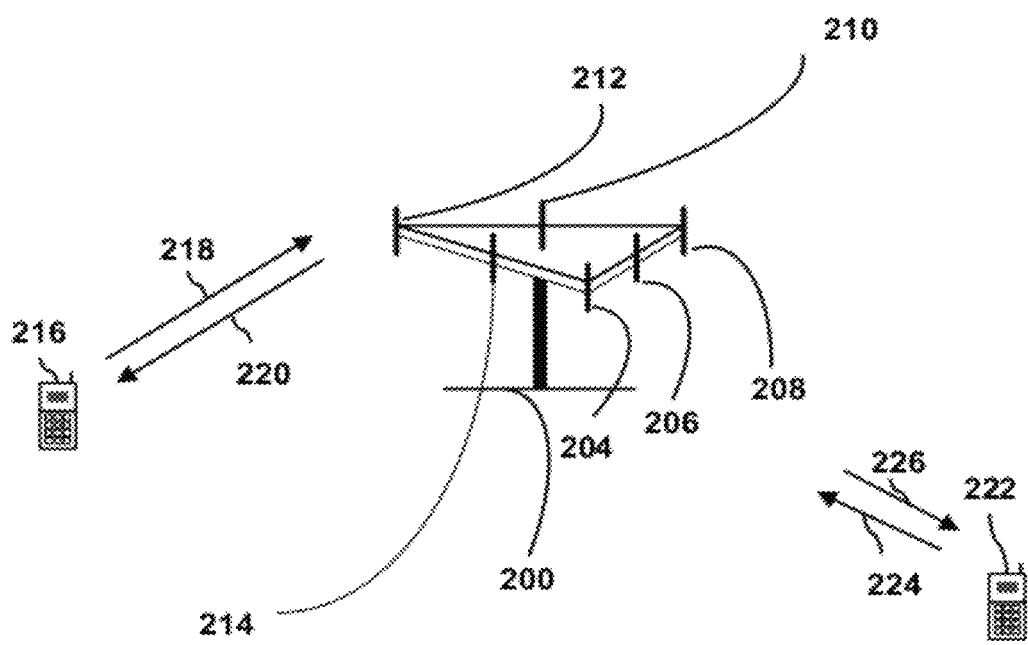
FIG. 2 illustrates a wireless communication system including a base station and multiple UEs.

Referring now to FIG. 2, a multiple access wireless communication system according to one aspect is illustrated. A base station (also referred to as an eNB) 200 may include multiple antenna groups, one including 204 and 206, another including 208 and 210, and an additional including 212 and 214. In FIG. 2, only two antennas are shown for each antenna group, however, more or fewer antennas may be utilized for each antenna group. UE 216 may be in communication with antennas 212 and 214, where antennas 212 and 214 transmit information to UE 216 over forward link 220 and may receive information from UE 216 over reverse link 218. UE 222 may be in communication with antennas 206 and 208, where antennas 206 and 208 transmit information to UE 222 over forward link 226 and receive information from UE 222 over reverse link 224. In a frequency division duplex (FDD) system, communication links 218, 220, 224 and 226 may use different frequency for communication. For example, forward link 220 may use a different frequency then that used by reverse link 218. In a time division duplex (TDD) system, time slots may be shared between the base station and different UEs.

Each group of antennas and/or the area in which they are designed to communicate is often referred to as a sector of the base station. Antenna groups each are designed to communicate to UEs in a sector, of the areas covered by base station 200. In communication over forward links 220 and 226, the transmitting antennas of base station 200 may utilize beam-forming in order to improve the signal-to-noise ratio of forward links for the different UEs 216 and 222 so as to improve communications and/or avoid interference to other nodes, such as other UEs served by different base stations. For example, a base station using beam-forming to transmit to UEs scattered randomly through its coverage may cause less interference to UEs in neighboring cells than a base station transmitting through a single antenna to all its UEs.

Wireless communication links between various wireless network nodes such as shown in FIGS. 1 and 2 may be implemented using licensed spectrum and/or wired connectivity. In addition, in accordance with various aspects, wireless connectivity may be further implemented using shared wireless communication links such as are further described below.

Cognitive radio refers generally to wireless communication systems where either a wireless network or network node includes intelligence to adjust and change transmission and/or reception parameters to provide efficient communication, while avoiding interference with other licensed or unlicensed users. Implementation of this approach may include active monitoring and sensing of the operational radio environment, including parameters such as, for example, frequency spectrum, modulation characteristics, user behavior and network state. Alternately, or in addition, cognitive radio implementations may include a database or other mechanism to allow network nodes to access information associated with other potential users and adjust transmissions based on that information. Multiple-access systems, such as LTE systems, may use cognitive radio techniques to utilize additional available spectrum beyond spectrum licensed for use by such systems.

Cognitive radio systems may use shared spectrum or channels, which, for the purpose of this disclosure, means channels where multiple users may share the spectrum either in a restricted or unrestricted fashion. One example is television white space (WS) as described further below. In WS spectrum, multiple user access may be supported, however, certain users such as licensed users of the WS may have priority and may require vacation by other potentially interfering shared users. Another example of shared spectrum is spectrum such as defined in the Instrumentation, Scientific, and Measurement (ISM) bands in the United States which allows equal access within the regulatory limitations of the spectrum. Shared spectrum may also include other similar equal-access spectral allocations. Another example of shared spectrum or channels are channels in the Authorized Shared Multiuser (ASM) spectrum, that may be licensed to a plurality of users, which must then share the space with other licensed users (while non-licensed users are prohibited from using the space).

Spectrum sensing techniques employed in cognitive radio systems may be used to detect potentially usable spectrum based on detection of primary users or other characteristics such as channel conditions, interference, etc. Once usable spectrum is detected, it may then be used either alone (if unoccupied) or shared, assuming other users are present, while minimizing or preventing harmful interference. For example, nodes in cognitive radio systems may be configured to sense spectrum holes, which may be based on detecting primary users (such as, for example, licensed users of the shared spectrum having higher priority or exclusivity of use when present), or other users (such as, for example, other unlicensed users, other shared licensed users, or other users that are authorized to share the spectrum).

Once usable spectrum is selected, it may then be further monitored to detect use by others and/or to vacate the channel. For example, for other higher priority users, such as emergency services, wireless microphones, or other licensed or priority users, the shared spectrum may need to vacated and communications transferred to other channels once a higher priority user is detected by a cognitive radio network node, such as a base station or eNB.

Such spectrum sensing techniques can include transmitter detection, where cognitive radio nodes have the capability to determine if a signal from a primary user is locally present in a certain spectrum. This may be done by techniques such as matched filter/correlation detection, energy or signal level detection or cyclostationary feature detection. A primary user may be a higher priority user, such as a licensed user of shared space. Cooperative detection may also be used. This approach relates to spectrum sensing methods where information from multiple cognitive radio users are incorporated for primary user detection. Interference-based, or other detection methods may likewise be used to sense available spectrum. In some cases, regulatory requirements may impose a constraint that a shared user monitor the channel periodically, such as hourly, daily, or at some other predefined time interval and vacate the channel if a primary user id detected. In some cases, faster vacation may be required, such as when an emergency service user requires use of the channel.

In some implementations, a shared user may be required to access a database of information, such as may be provided by a regulatory agency such as the Federal Communications Commission (FCC) in the U.S., or by another governmental or private entity to determine availability of spectrum for use.

Cognitive radio systems generally include components providing functionality to determine the best available spectrum to meet user and/or network communication requirements. For example, cognitive radios may decide on the best spectrum band to meet specific Quality of Service (QOS) requirements over available spectrum bands. This requires associated spectrum management and control functions, which may include spectrum analysis as well as spectrum decision processing to select and allocate available spectrum.

Because the spectrum used in cognitive radio systems is typically shared, changes in the operational frequencies utilized by system users, i.e., "spectrum mobility" is also of concern. Such changes are generally effected in a dynamic manner by allowing the nodes to operate in the best available frequency band, and maintaining seamless communications during the transition to other/better spectrum. Spectrum sharing relates to providing a fair spectrum scheduling method.

Consequently, one important aspect of cognitive radio relates to sharing use of licensed spectrum by unlicensed users. Use of this shared spectrum may be integrated with other wireless communication methodologies, such as LTE systems. In accordance with certain aspects, users of other licensed channels (such as, for example, spectrum and channels licensed for GSM, WCDMA, LTE, etc.) may also operate in white space, subject to licensed or primary users (as well as, in some cases, other unlicensed users). In exemplary embodiments, WS spectrum and channels, such as described subsequently, may be used as shared spectrum and shared channels. However, in other applications, different shared spectrum and channels, such as ISM spectrum, ASM spectrum, or other multi-user shared spectrum may alternately be used.

WS refer generally to frequencies allocated to a broadcasting service or other licensed user that are not used locally, as well as to interstitial bands. For example, in the United States, the switchover to digital television in 2009 created abandoned spectrum in the upper 700 megahertz band (698 to 806 MHz), and additional whitespace is present at 54-698 MHz (TV Channels 2-51) which is still in use for digital television. Incumbent primary users may include licensed television broadcasters on existing channels, wireless microphone systems, medical devices, or other legacy devices. In 2008, the FCC approved unlicensed use of this white space. However, these so-called "TV Band Devices," may be required to operate in the vacant channels or white spaces between television channels in the range of 54 to 698 MHz.

The rules defining these devices were published by the FCC in a Second Report and Order on Nov. 14, 2008. The FCC rules define fixed and personal/portable devices. Fixed devices may use any of the vacant US TV channels 2, 5-36 and 38-51 with a power of up to 1 watt (4 watts EIRP). They may communicate with each other on any of these channels, and also with personal/portable devices in the TV channels 21 through 51. Fixed devices must be location-aware, query an FCC-mandated database at least daily to retrieve a list of usable channels at their location, and may be required to also monitor the spectrum locally once every minute to confirm that no legacy wireless microphones, video assist devices, or other emitters are present. For example, if a single transmission is detected, the device may be required to not transmit anywhere within the entire 6 MHz channel in which the transmission was received. Fixed devices may transmit only within the TV channels where both the database indicates operation is permissible, and no signals are detected locally.

Personal/portable stations may operate only on channels 21-36 and 38-51, with a power of 100 mW EIRP, or 40 mW if on a channel adjacent to a nearby television channel. They may either retrieve a list of permissible channels from an associated fixed station, or may accept a lower output power of 50 mW EIRP and use only spectrum sensing.

As noted previously, existing wireless networks may be enhanced by addition of cognitive radio functionality and use of shared channels, such as WS or other channels. In one aspect, a LTE system may include cognitive radio functionality as further illustrated below. As used herein, a legacy LTE system or system component refers generally to systems or components configured to operate based on definitions of earlier releases, such as Release 8. Shared or WS-enabled devices may be configured to operate under later releases, such as, for example, Release 9, Release 10, or future releases. Implementations under these later releases may be known as LTE advanced (LTE-A) systems and devices. In one aspect, combinations of licensed spectrum and white space spectrum may need to be detected, sensed, measured, and/or managed in common so as to provide the best overall performance or resource allocation.

Figure 3:
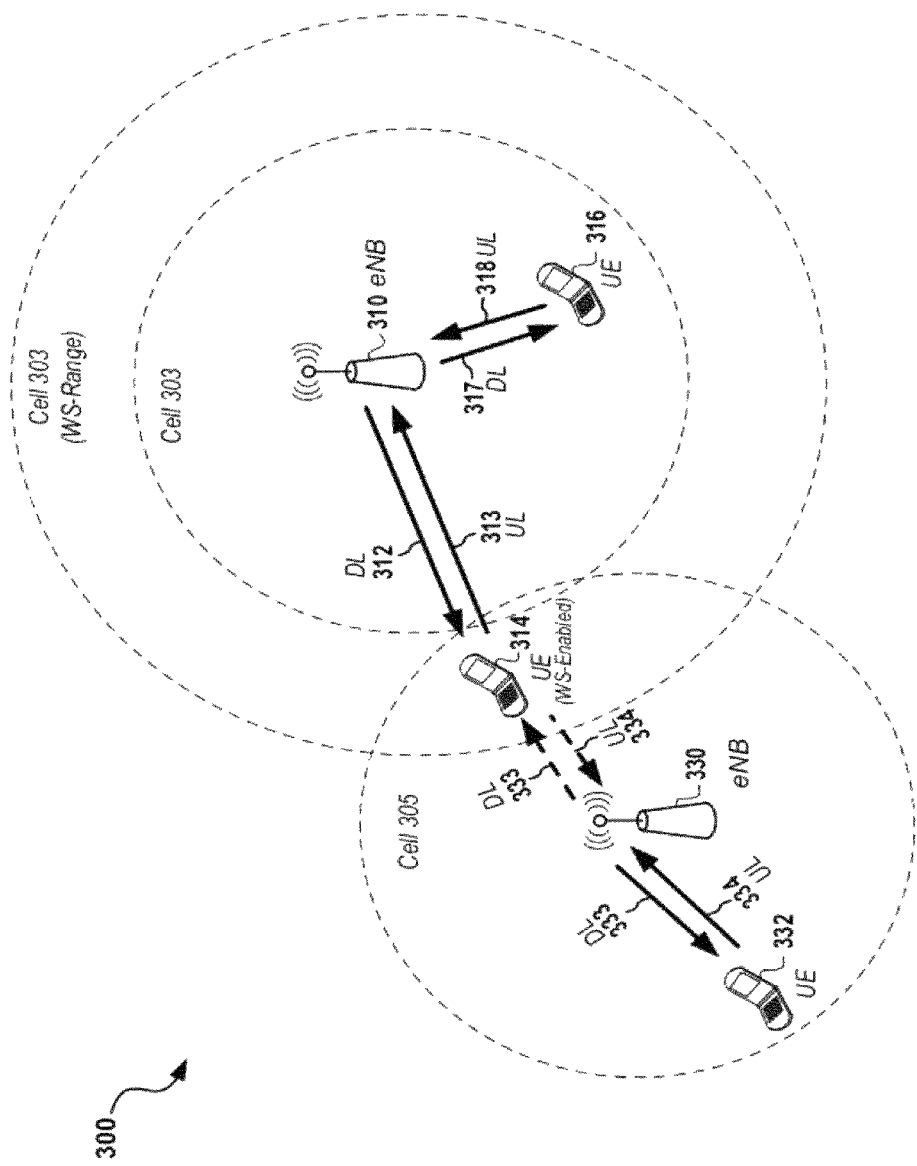
FIG. 3 illustrates a cognitive radio system using shared channels such as white space channels to communicate to UEs.

Attention is now directed to FIG. 3, which illustrates a cognitive LTE system 300 configured to utilize WS or other shared channels for eNB to UE communications, such as in the UHF television WS spectrum. A first cell 303 may be configured to utilize WS on one or both of the downlink (DL) and uplink (UL). In one implementation, licensed spectrum is used for the UL, while WS may be used for the DL for certain communications. For example, a WS-enabled eNB 310 may be in communication with a first UE 316 as well as a second UE 314. UE 316 may be a non-WS enabled UE, whereas UE 314 may be WS-enabled. (as denoted herein, WS-enabled refers to a network device configured to utilize shared channels such as white space, typically in addition to licensed spectrum). In the example, DL 317 and UL 318, between eNB 310 and UE 316, are configured to use licensed spectrum, whereas DL 312, between eNB 310 and UE 314, may be configured to use WS, while UL 313 may be configured to use licensed spectrum.

Another cell 305 may be adjacent to cell 303 and may be configured with an eNB 330 to communicate with UE 332 using licensed spectrum for DL 333 and UL 334. In some situations, UE 314 may be within range of eNB 330 and as such may be subject to attempts by UE 314 to access eNB 330. In some implementations, it may be desirable to use WS-enabled base stations (i.e., eNBs, HeNBs) in low power nodes (i.e., piconodes and femtonodes) due to FCC power limitation regulations such as described previously herein. The cells shown in FIG. 3 may be part of a heterogeneous network, which may utilize bandwidth sharing such as resource partitioning.

As noted previously, use of WS by devices in cognitive networks requires sensing of channel conditions. In systems, such as LTE cognitive systems, configured to operate in TV band WS, FCC requirements may require monitoring the spectrum being utilized by a secondary device (i.e., a non-licensed user) for primary uses and vacation of the channel if a primary user is detected (e.g., primary user sensing and detection). Alternately, or in addition, an eNB may be required to connect to a database and access information about other higher priority users in proximity to the base station that may be impacted on the shared channels.

Typical WS primary uses may be UHF television channels, wireless microphones, or other legacy devices. In addition, coordination with other secondary users may be desirable to facilitate sharing. For example, proposed FCC requirements mandate checking the channel for 30 second before switching to a new channel, and monitoring channels at least every 60 seconds for primary users and vacating the channel within 2 second when a primary user is detected. During checking, a quiet period may be required in which no signal transmission of any network device is done. For example, in an LTE network having an eNB and three associated UEs, all four of these devices may be required to refrain from transmitting during the quiet period so that other users may be detected.

Figure 4:
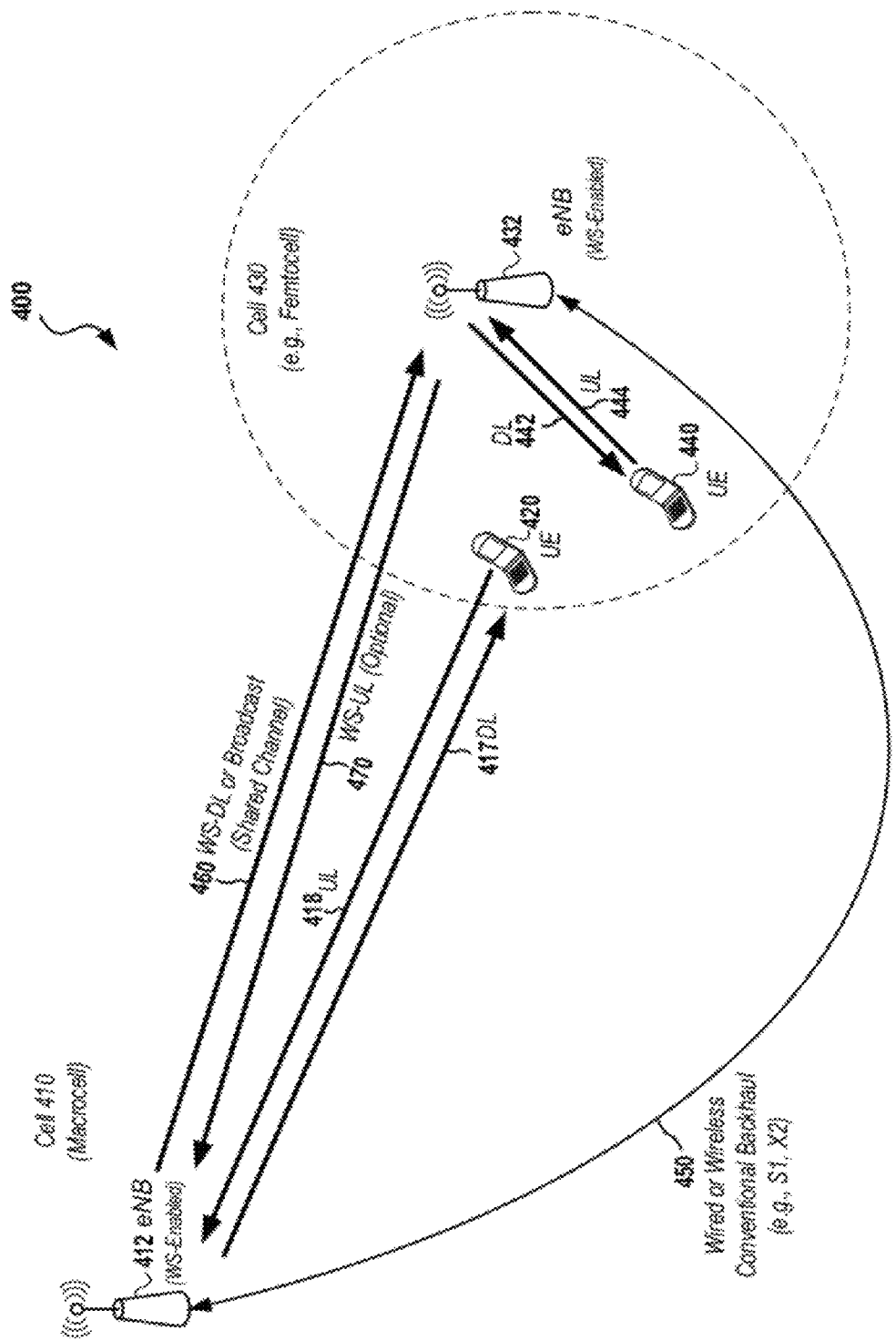
FIG. 4 illustrates a communication system using shared channels to provide certain backhaul information between base station nodes.

Aspects of the disclosure relate to use of licensed spectrum for backhaul signaling in conjunction with shared channels, such as in cognitive LTE systems. This may be done in conjunction with base station to eNB signaling using shared spectrum, such as WS channels as shown in FIG. 3, and/or may be done only between one or more base stations or eNBs. Attention is now directed to FIG. 4, which illustrates an example cognitive LTE system 400 including cell 410, which may be a macrocell, having associated eNB 412, which may be WS-enabled (as denoted herein, WS-enabled refers to an eNB that is configured to use shared channels, which may be any of the configurations described previously, such as using TV WS channels, ISM channels, ASM channels, and/or other shared channels).

An adjacent cell 430 and associated eNB 432 may be in communication with eNB 412 of cell 410 using conventional backhaul signaling, such as X2 and/or S1 signaling as described in the LTE Specifications. In some implementations, cell 430 may be a femtocell, picocell or other cell configuration; however, for purposes of illustration, FIG. 4 is described based on the assumption that cell 410 is a macrocell having a range including at least the distance to UE 420 and eNB 432 as shown. UE 420 may be served by eNB 412 via downlink 417 and uplink 418, but may be in proximity to base station 432. For example, UE 420 may be moving away from eNB 412 and may not have been handed off, or cell 430 may be a Closed Subscriber Group (CSG) cell to which UE 420 may not be able to connect, or UE 420 may otherwise not be connected to eNB 432 and cell 430.

eNB 430, which may be a femtonode (e.g., a base station node in a femtocell), a picocell, a macrocell, or another cell type and may be serving cell 430. eNB 432 and may be in communication with one or more additional UEs (e.g., UE 440, and other UEs not shown). In one exemplary embodiment cell 430 is a femtocell and eNB 432 is a femtonode. UE 420 may be in close proximity to eNB 430 and/or may receive a strong signal from eNB 432 than from eNB 410 which may cause interference. For example transmissions on DL 442 from eNB 432 to UE 440 may interfere with transmissions on DL 417 from eNB 412.

In order to address potential interference between cells such as shown in FIG. 4, such as in heterogeneous networks (e.g., networks having multiple types of cells and associated base stations, such as macrocells of one or more power levels, femtocells, picocells, or other cell types) Coordinated Multipoint Transmit/Receive (CoMP) technology is being developed. CoMP techniques provide coordination between cells to monitor and control transmissions to UEs, to mitigate interference. Existing CoMP techniques have been described using wired backhaul connections.

These existing backhaul connections, however, have various drawbacks. For example, wired backhaul connectivity, such as X2 connectivity, is typically expensive and may not scale well with recent increases in data traffic and demand. Wireless backhaul communications on licensed spectrum, such as S1 connections as typically used in relay node implementations, have to share the same spectrum with ongoing communication between the eNBs and associated UEs. In order to avoid interference, methods such as resource partitioning have been developed to avoid superposition of backhaul with transmission to/from UEs (for example, the so-called access link). However, since spectrum is a scarce resource, devoting spectrum for backhaul communications typically requires a reduction of the spectrum available for communication to/from UEs The above-described problems associated with wireless backhaul on licensed spectrum may arise because wireless network devices have to share the licensed spectrum. However, the availability of shared channels allows for use of these shared channels for backhaul signaling. Such backhaul signaling may include any of various types of backhaul data communication, such as downlink CoMP (DL-CoMP) signaling as described above to facilitate coordination between base stations regarding interference mitigation.

Use of shared channels and spectrum may be inherently less reliable than licensed spectrum because of the possibility of other known or unknown users and the potential that they may begin to use the channel at any time. As such, they are inherently less reliable than licensed channels (which may be denoted herein as "unreliable channels" indicating that the channel and interference characteristics are less known than for dedicated licensed channels). Consequently, shared channels may be legally jammed primary users or other secondary users (e.g., a different wireless radio technology that is cognitive-capable and that decides to use the same unlicensed channel). Therefore, unlicensed channels may be subject to outage periods. This problem may, however, be reduced by means of a suitable dynamic frequency selection (DFS) technique, provided that enough unlicensed channels are available with respect to the number of competing systems. Although shared channel backhaul communications may not be suitable as the only means of communication between two nodes, in various aspects they may be used to supplement other reliable, but more expensive, and/or higher latency legacy backhaul wired or wireless channels.

For example, if it assumed that at least one shared channel (e.g., white space radio) transmitter is available in each eNB, by adding a shared channel UE receiver in all eNBs, a WS channel can be used for communication between two nodes using either standard DL LTE waveforms or waveforms tailored for specific types of backhaul data. For example, coordination messages used by CoMP (assuming no joint transmission), namely scheduling decisions, channel state information (CSI) of scheduled UEs, priority of scheduled UEs, etc, may be exchanged.

These types of messages have to be exchanged quickly on a subframe basis, and wired backhaul latency presents a significant barrier to using legacy wired backhaul connections. On the other hand, radio backhaul may have as little as 1 subframe latency (if processing time, which will generally be minimal, is neglected). Consequently, using radio channels, such as shared channels as described above, for signaling of such data may be significantly better that the latencies experienced while using wired legacy backhaul connections, especially in congested networks.

Typical backhaul data suitable for applications such as CoMP may be characterized as follows. First, the amount of data to be exchanged for every subframe is very limited, thus the capacity offered by a 5 MHz radio backhaul channel may be enough to convey all coordination messages (no queues and no delays). The most reliable LTE packet format could always be used, so as to target one single transmission (however, retransmissions would increase delay). Therefore, in some implementations two or more transmissions may be used if acceptable in terms of delays. Moreover, reliable communication among geographically separated eNBs is possible due to the techniques including using of the most reliable packet format, allowing to work at very low SNRs; providing interference-coordination techniques to avoid any interference on the radio backhaul channel; eNBs will usually have better antenna gains than UEs thus the eNB-eNB link is better than eNB-UE.

Two eNBs may only be required to coordinate if there's a victim UE (served by one of the eNBs, such as macrocell eNB) that sees strong signals from both. Consequently, in this scenario it is reasonable to assume that the path loss between the two eNBs cannot be very large.

Use of shared spectrum for certain types of backhaul therefore provides a number of potential advantages. For example, shared channel radio backhaul will typically have a very low latency, which is desirable for applications such as CoMP, but it's potentially unreliable due to primary and secondary interferers on the shared channels. On the other hand, if a radio backhaul link becomes unusable, the destination node can be configured to quickly detect this situation (for example by looking at channel quality indicators (CQIs) or cyclic redundancy check (CRC) of received packets), perform cognitive sensing, and ask the neighbor eNB (such as by using legacy wired or wireless backhaul connections) to change channels and to stop assuming CoMP is used (this information may be used by the MAC scheduler of the source node). In implementation, this process may take hundreds of ms, but doesn't entail any system outage. During those periods CoMP won't be used in some portions of the network and the system performance will simply drop for a while, until a new radio backhaul is reestablished.

If the capacity offered by a single WS channel is much larger than the amount of data actually exchanged between two eNBs (for example, that may be the case in the CoMP scenario described above), it can be partitioned and each point-to-point link may be assigned a portion of a shared white space channel. Either distributed or centralized coordination algorithms may be used to control this allocation too, with the aim of minimizing interference among different point-to-point links.

In addition, both wired and white space wireless backhauls can be used together, depending on the availability of the cognitive modem in the eNBs, availability of white space channels, quality and congestion of the wired backhaul, and/or based on other factors such as described elsewhere herein. For example, some portions of the network may be configured to rely on the wired backhaul and others on the shared channel/white-space radio links, and some other nodes might dynamically migrate from one technology to the other depending on, e.g., backhaul congestion or other factors.

A cognitive coordination algorithm may be used to decide which white space channel(s) to use for the backhaul wireless link described in this document. Coordination among eNBs may be needed to avoid or reduce interference on the backhaul wireless link, although coordination (which may exploit the existing reliable backhaul link) needs not to be very fast, thus the overhead on the reliable backhaul due to coordination is small.

Although the techniques and aspects described herein may be implemented in exemplary embodiments in eNB-eNB or eNB-relay application, other aspects of communications systems may also use them. For example, they may be applied to dynamic inter-cell interference coordination (ICIC) algorithms in heterogeneous networks, in which the shared channel wireless backhaul may be used, for example, to exchange CQI or other messages.

According to current FCC regulations on shared channels in the white space spectrum, several low-frequency channels are designated for fixed transmitters only, namely macro nodes in a cellular network. If such a channel which cannot be paired with another channel to form FDD exists, then the only use is either DL-only or a TDD version of the wireless backhaul described here. In addition, the white-space RF requirements mandated by regulatory agencies such as the FCC may be challenging for UEs or other mobile devices to implement. However, regulatory white space requirements may be more readily implemented in base stations/eNBs due to additional available resources such as power, size, processor and/or memory capability, or other advantages available to fixed devices.

Returning to FIG. 4, one example of such as configuration for supplementing backhaul communications using one or more white space channels in system 400 is illustrated. In particular, eNB 412 and eNB 432 may be configured with transmitters and/or receivers to determine one or more suitable shared channels and communicate backhaul signaling via those channels. For example, a first downlink shared channel 460, which may be, for example, a DL WS channel, may be used by eNB 412 to provide backhaul information to eNB 432, such as CoMP information regarding scheduling and CSI associated with UE 420. Other backhaul communications may be provided via a wired or wireless legacy or convention backhaul connection 450, which may be, for example, a wired or wireless backhaul connection.

Upon receipt of the information provided from eNB 412 via shared channel 460, eNB 432 may adjust transmissions to one or more UEs, such as, for example, transmissions on downlink channel 442, to mitigate interference to UE 420. This may be done by, for example, beamforming the downlink signal to reduce energy in the direction of UE 420. Alternately, or in addition, timing of transmissions may be coordinated so as to reduce simultaneous transmissions towards UE 420 from both eNB 412 and eNB 432, and/or from UE 440.

In some implementations, communications may be unidirectional between eNB 412 and 432, such as, for example, signaling only on channel 460 and not channel 470. However, in other implementations, signaling may be bi-directional, such as, for example, providing feedback from eNB 432 to eNB 412, and/or providing other backhaul signaling or information.

Figure 5:
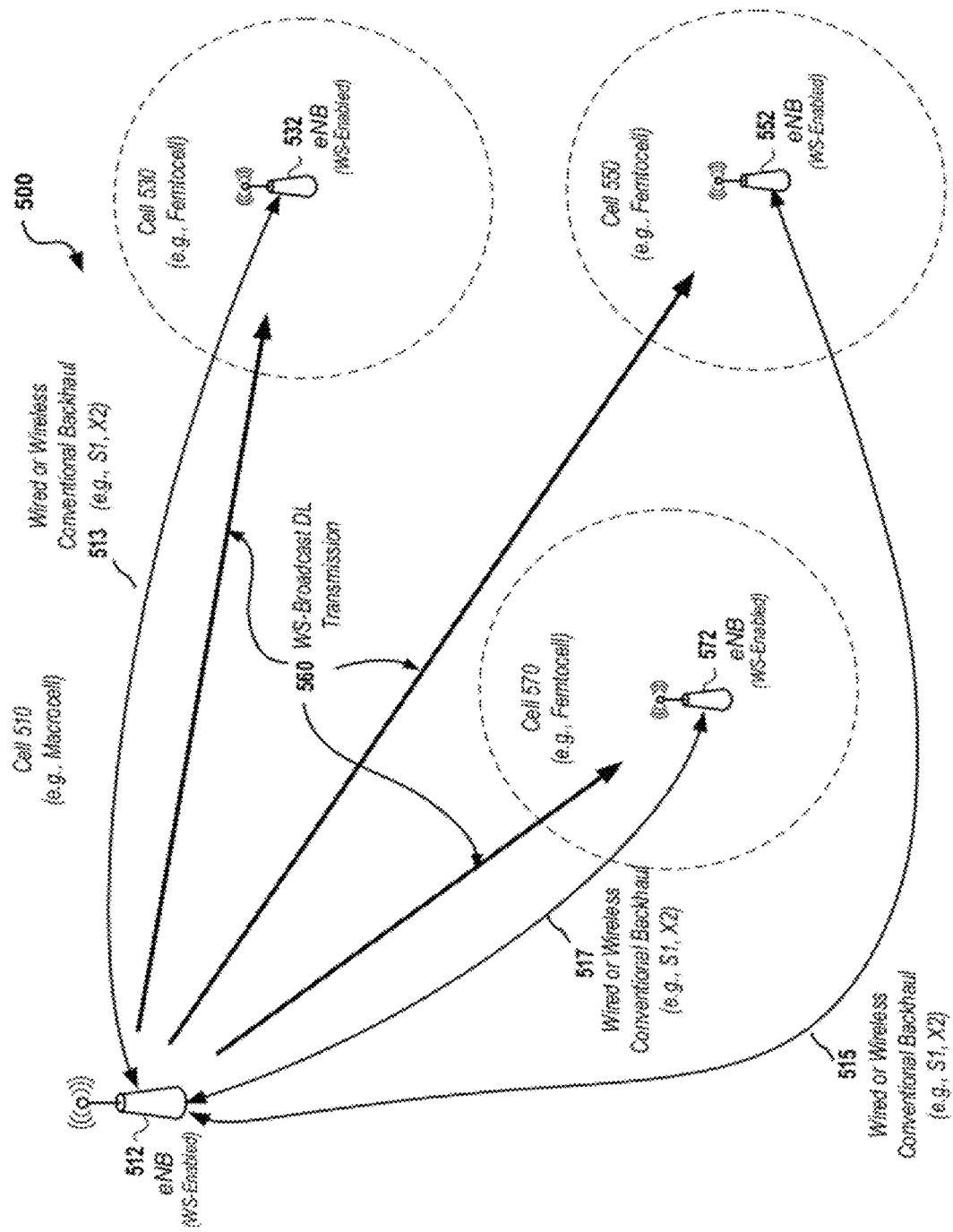
FIG. 5 illustrates a communication system using shared channels to provide a broadcast communication including certain backhaul information between base station nodes.

In some networks, coordination between multiple cells may be implemented. For example, multiple femtocells (or other cells) may be within the coverage area of a macrocell. In this example, coverage to the macrocell's served UEs may benefit from coordination of transmissions between the various other cells. FIG. 5 illustrates an example of such a system configuration 500, where three femtocells 530, 550, and 570 (which may, in various implementations, be other cell types such as additional macrocells, picocells, etc.) are within the coverage area of a macrocell 510, which may be served by a base station 512, which may be, for example, a macrocell eNB.

Each femtocell may be served by a corresponding base station (e.g., eNBs 532, 552, and 572), which may be femtonode eNBs and/or other types of eNBs. eNBs 532, 552, and 572 may be in communication with eNB 512 via a legacy or conventional backhaul connections, such as connections 513, 515, and 517, respectively. These may be LTE X2 or S1 connections, or other legacy backhaul connections.

In order to improve performance and/or offload data transmission requirements from the legacy backhaul connections, one or more shared channels, such as white space, ISM, shared license, such as ASM, or other shared channels may be used to send certain backhaul information, such as, for example, CoMP coordination data or information. In system 500, this may be done by providing a broadcast transmission 560 on one or more shared channels that may be received by one or more (typically all) of the cells 530, 550, and 570. The broadcast backhaul information may include information to facilitate interference mitigation with UEs served by base station 512 by, for example, adjusting transmission timing, beamforming, or other parameters. The broadcast information may include information regarding UEs in proximity to one or more of the cells 530, 550, and 570, and may be commonly received by each of the associated base stations. Although broadcast signaling of backhaul information may include only a downlink connection, in some implementations, an associated uplink (not shown) may be established between one or more of the base stations 532, 552, and 572. These links may be in the same or a different shared channel or may be in a legacy backhaul channel, including an already established legacy backhaul connection as shown in FIG. 5.

Figure 6:
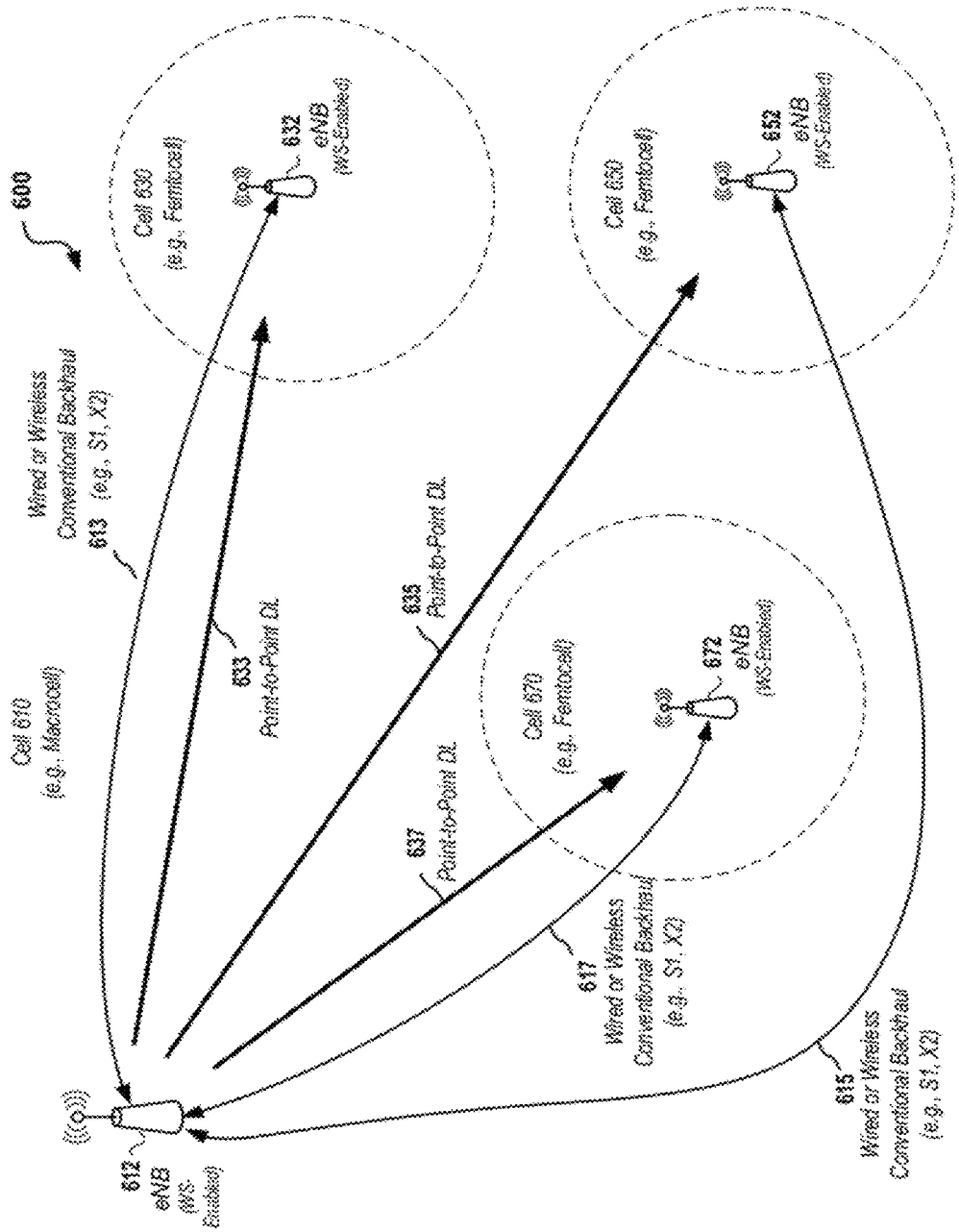
FIG. 6 illustrates a communication system using shared channels to provide point-to-point communications including certain backhaul information between base station nodes.

FIG. 6 illustrates an embodiment of a system 600 which may generally be analogous to system 500 shown in FIG. 5. In particular, multiple cells (e.g., cells 610, 630, 650, and 670) may be in coordinated communication using a legacy backhaul connection such as connections 613, 615, and 617. In system 600, however, each base station (e.g., eNB 632, 652, and 672) may communicate via a point-to-point connection with base station 612, rather than through a broadcast transmission. This may be done if, for example, coordination between multiple cells is not possible or for other reasons, such as cells being part of a CSG, etc.

In this way, backhaul information, such as CoMP information associated with coordination and interference caused by each cell may be separately signaled between eNB 512 and associated base stations 632, 652, and 672. For example, point-to-point link 633 may be used to provide backhaul information from eNB 612 to eNB 632, and similar connections 635 and 637 may be used to provide backhaul communications to and/or from cells 650 and 670. Links 633, 635, and/or 637 may be unidirectional links in some cases or may be bi-directional links in other implementations. In the case of bi-directional links, the remove eNBs (e.g., eNBs 632, 652, and 672) may provide feedback information regarding coordination, interference mitigation, and/or other data or information.

Figure 7:
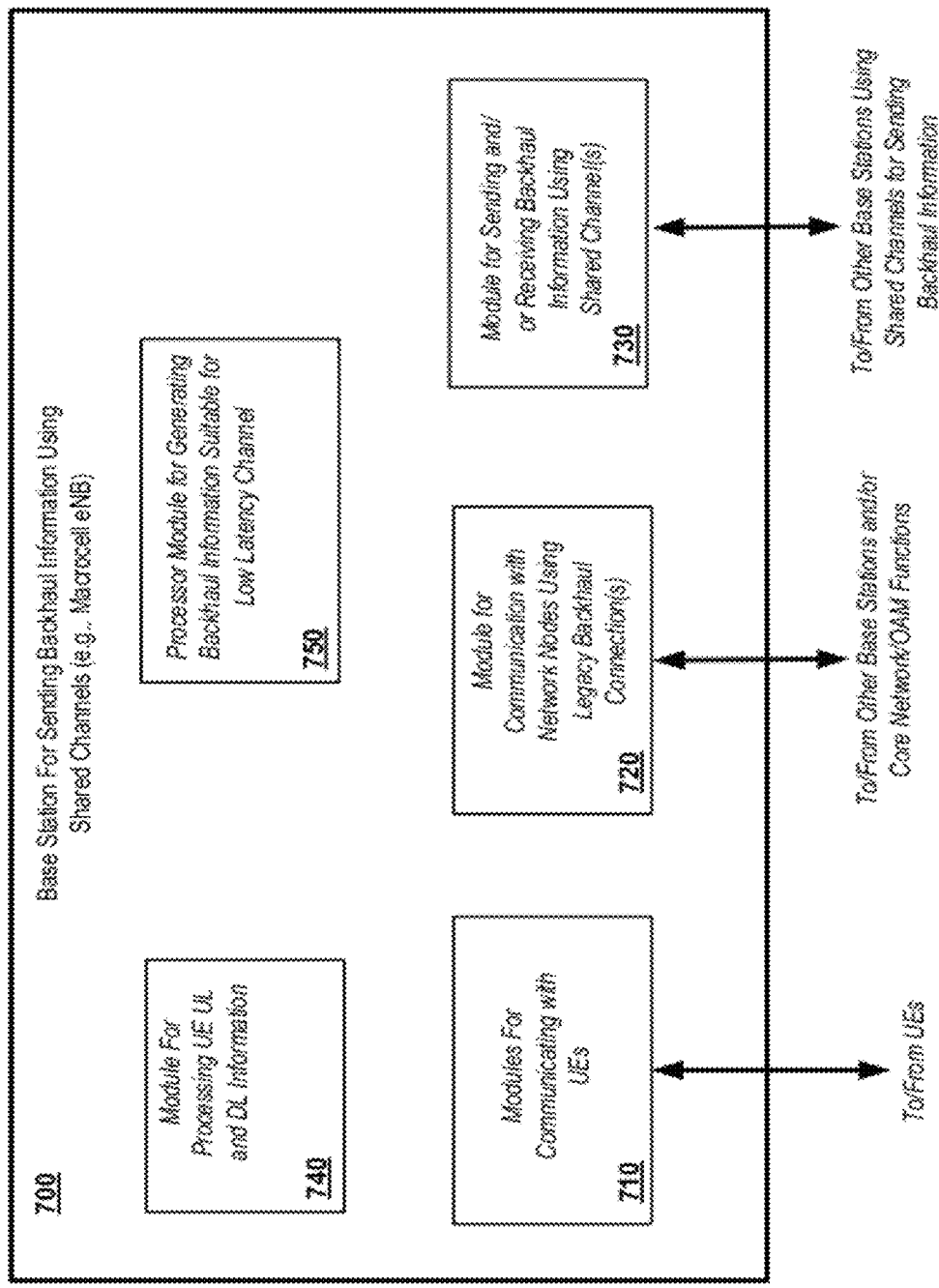
FIG. 7 illustrates a base station configured to generate and send certain backhaul information using shared channels.

FIG. 7 illustrates an embodiment of a base station 700, which may be configured for providing backhaul communications, such as for providing CoMP information, using shared channels. Various implementation details of base station 700 are omitted for clarity, however, additional details of a base station such as base station 700 are further shown in FIG. 15.

Base station 700 may be a macrocell base station such as base station 412 as shown in FIG. 4 or base stations 512 of FIG. 5 or 612 of FIG. 6, and may include one or more modules 710 for communicating via uplinks and downlinks with UEs, such as shown in FIG. 3. One or more processing modules 740 may be included to receive, decode, encode, and send information to and from the UEs, such as data or control information. Base station 700 may include one or more module 720 configured to communicate with other network nodes, such as other base stations and core network (CN) components, such as functions providing Operations, Administration and Management (OA&M) functions, Mobility Management Entities (MMES), Gateways (GWs), and/or other network components using legacy backhaul connections, such as X2 and/or S1 connections.

In addition, base station 700 may include one or more modules 730 for sending and/or receiving backhaul information using shared channels, such as white space, ISM, shared licensed channels, and/or other shared channels and associated shared spectrum. One or more processor modules 750 may be coupled with modules 710, 720, and/or 740 to generate backhaul information suitable for transmission over the shared channel. This information may be, for example, CoMP information as described previously herein. For example, information received from one or more UEs at module 710 and/or module 740 may be provided to processor module 750 to generate information for transmission, via the shared channel or channels, to another base station, such as base station 432 of FIG. 4, or base stations 532, 552, and 572 of FIG. 5 or base stations 632, 652, and 672 of FIG. 6. Processor module 750 may be further configured to select a shared channel or channel for transmission of information via module 730. This may be done by, for example, receiving information from a database or other memory or storage apparatus, and/or by scanning shared channels, such as in conjunction with module 730, to determine a suitable shared channel or channel. The searching may include searching for primary users and/or other users, and may also include, for example, receiving channel information, interference information, and/or other information that may be used to select the channel or channels.

Module 730 may be configured to include a shared spectrum transmitter module, such as a transmitter configured to send backhaul information on WS, ISM, ASM, and/or other shared channels. Module 720 may be configured to include a licensed channel transmitter module, which may be implemented in conjunction with module 710. The licensed channel transmitter module may be configured to provide other backhaul information (alternate or in addition to the information transmitted by module 730).

Figure 8:
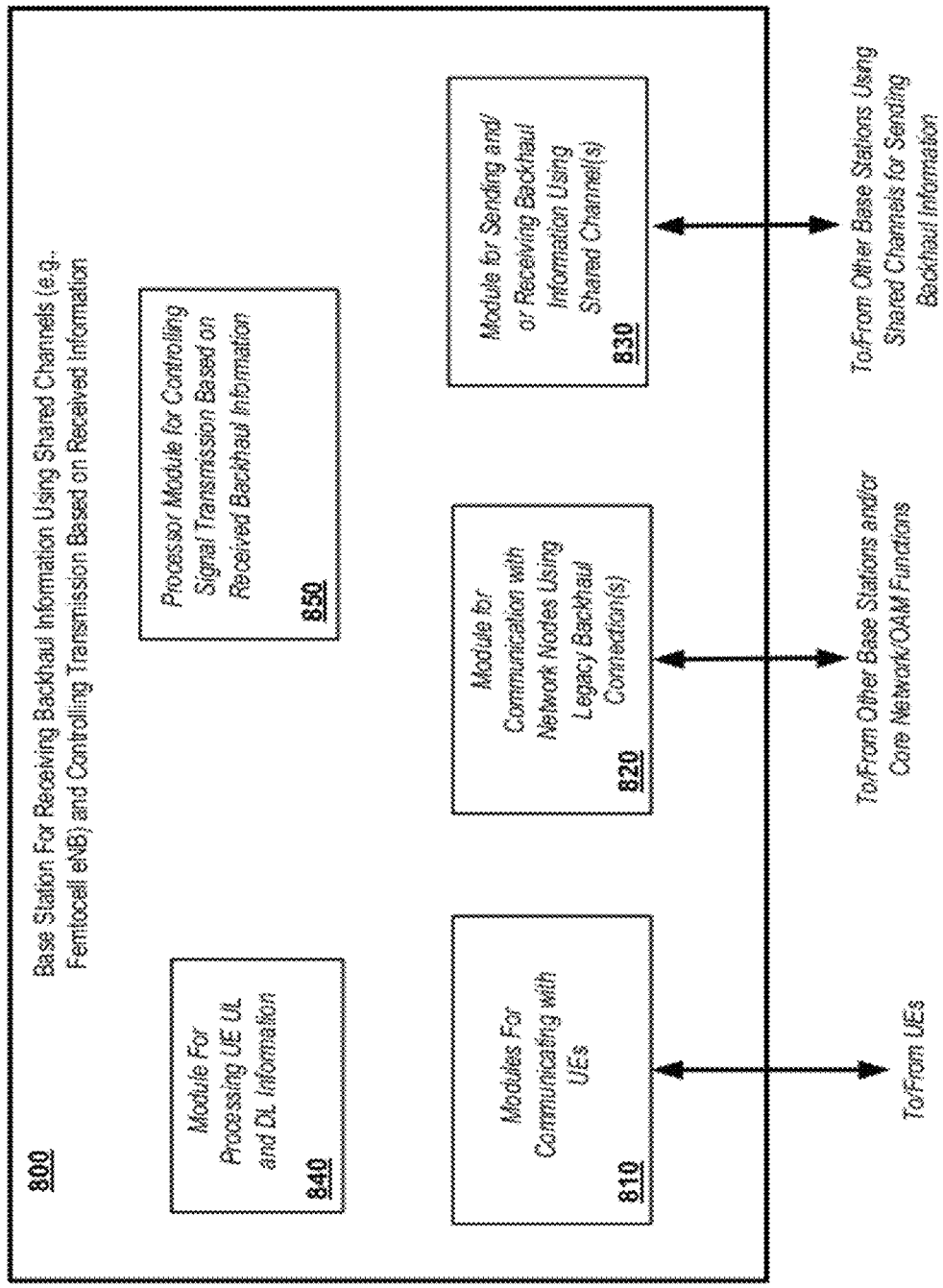
FIG. 8 illustrates a base station configured to receive certain backhaul information using shared channels and control transmissions based on the information.

FIG. 8 illustrates an embodiment of a base station 800, which may be configured for receiving backhaul communications, such as CoMP information, using shared channels, and adjusting transmissions based on the received backhaul information. As with base station 700, various implementation details of base station 800 are omitted for clarity, however, additional details of a base station such as base station 800 are further shown in FIG. 15.

Base station 800 may be a femtocell or picocell base station such as base station 432 of FIG. 4, base stations 532, 552, and 572 of FIG. 5, or base stations 632, 652, and 672 of FIG. 6. Base station 800 may include one or more modules 810 for communicating via uplinks and downlinks with UEs, such as shown in FIG. 3. One or more processing modules 840 may be included to receive, decode, encode, and send information to and from the UEs, such as data or control information. In addition, processing module 840 may be used to generate an adjusted transmission for sending via a transmitter element of module 810, such as to mitigate interference with a UE served by a neighboring base station.

Base station 800 may include one or more module 820 configured to communicate with other network nodes, such as other base stations and core network (CN) components, such as functions providing OA&M functions, Mobility Management Entities (MMES), Gateways (GWs), and/or other network components using legacy backhaul connections, such as X2 and/or S1 connections.

In addition, base station 800 may include one or more modules 830 for sending and/or receiving backhaul information using shared channels, such as white space, ISM, shared licensed channels, and/or other shared channels and associated shared spectrum. In particular, module 830 may be configured to receive certain backhaul information over a shared channel and provide the information to a processor module such as module 850 to facilitate interference mitigation.

One or more processor modules 850 may be coupled with modules 810, 820, and/or 840 to receive backhaul information and adjust a transmission, such as from module 810, based on the information. The received information may be, for example, CoMP information as described previously herein and the transmission may be adjusted to mitigate interference with a UE served by a neighboring base station.

Figure 9:
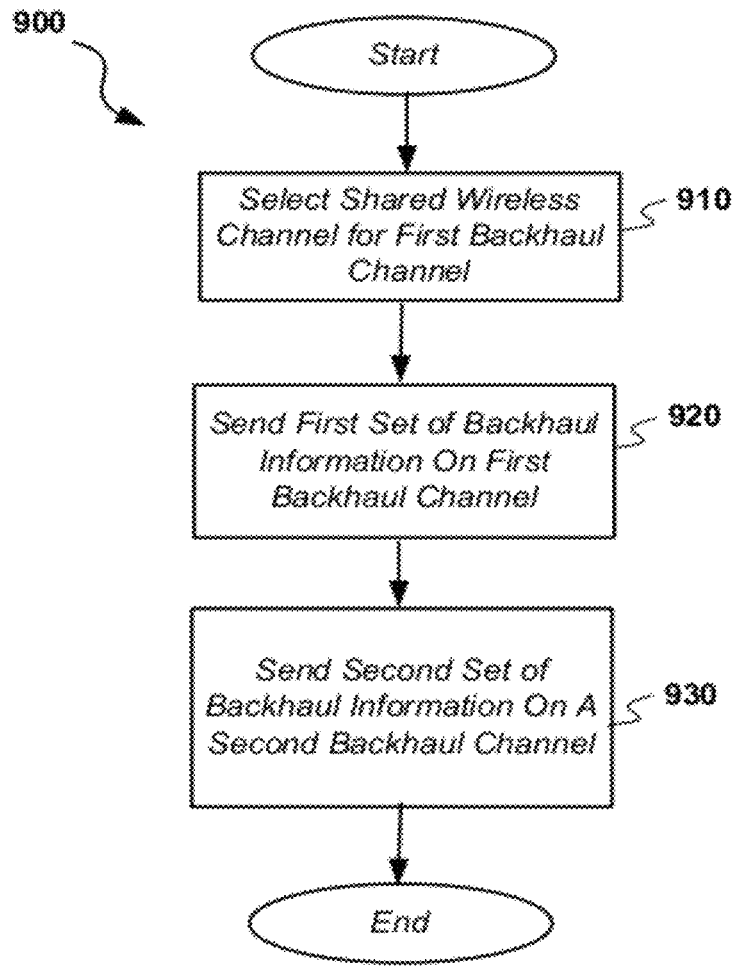
FIG. 9 illustrates a process for providing certain backhaul information from a first network node to a second network node using shared channels.

FIG. 9 illustrates an embodiment of a process 900 for providing backhaul communications in a wireless network using a shared wireless channel. At stage 910, a shared wireless channel may be selected for use as a first backhaul channel between a first wireless network node and a second wireless network node. At stage 920, a first set of backhaul information may be sent from the first wireless network node on the selected first backhaul channel. At stage 930, a second set of backhaul information may be sent from the first wireless network node on a second backhaul channel established between the first wireless node and the second wireless node.

The stage 920 of sending a first set of backhaul information may include, for example, transmitting the first set of backhaul information on a shared unlicensed channel. The first set of backhaul information may be sent from a base station, which may be an LTE eNB, to a second base station, which may be another LTE eNB. The first eNB may be a macrocell base station and the second eNB may be a femtocell base station. Alternately, the first set backhaul information may be sent from a relay node and the second wireless node may be a macro base station.

The unlicensed channel may be, for example, a WS channel, an ISM channel, and/or another channel allowing unlicensed radio transmissions. The shared channel may include restrictions on users such as priority on usage. The priority on usage may be associated with primary users having a higher priority and secondary users having a lower priority. Alternately, or in addition, the hared channel may have no limitations on shared access and/or use. Alternately, or in addition, the sending may include transmitting the first set of backhaul information on a licensed channel allowing share use among multiple licensed users. The channel may be, for example, an ASM channel or other shared licensed channel.

The stage 920 of selecting a shared wireless channel may include, for example, scanning a set of shared channels for one or more primary users and selecting the shared channel based on absence of a primary user. The primary user may be a licensed user and the channels may be white space channels. Alternately, or in addition, the selecting a shared wireless channel may include accessing a database of channel usage information and selecting the shared wireless channel based at least in part on information provided form the database.

The database may include, for example, information identifying primary users and/or information providing geographic information associated with the primary users. The selecting may be based in part on comparing the geographic information associated with the primary users with known or determined geographic location information associated with the base station.

Alternately, or in addition, the shared channel may be selected based on a signal metric associated with the shared channel. The signal metric may be a signal-to-interference ration metric. The signal metric may be channel information associated with the shared channel. The selecting a shared channel may include selecting a plurality of channels for sending the first set of backhaul information. The first set of backhaul information may be sent on two or more of the plurality of channels.

The second backhaul channel may be carried by, for example, a wired communications link. The wired communication link may be an S1 or X2 link. Alternately, or in addition, the second backhaul channel may be carried on a licensed wireless channel.

The first set of backhaul information may include, for example, information requiring a low-latency channel. The low latency channel may be a low reliability channel. The second set of backhaul information may include information suitable for a high-latency channel. The high latency channel may be a high reliability channel. The first set of backhaul information may include information requiring a low-data rate channel. The second set of backhaul information may be information requiring a high-data rate channel. The first set of backhaul information may be transmitted so as to provide higher reliability on the shared channel. The higher reliability may be provided using a using a modulation and coding scheme having a low spectral efficiency and a high energy efficiency.

The first and second wireless nodes may be, for example, eNBs and the first set of backhaul information may include a first set of CoMP information for coordinating transmission between the first and second wireless nodes. The first and second eNBs may be base stations in a heterogeneous network. The first eNB may be a macrocell eNB and the second eNB may be a femtocell eNB, a picocell eNB, or a macrocell eNB having a different output power level.

The first set of backhaul information may include, for example, a first set of CoMP information. The first set of CoMP information may include CoMP information requiring a low latency. The CoMP information may include transmission scheduling information. Alternately, or in addition, the CoMP information may include CSI of one or more UEs scheduled by or otherwise associated with the first wireless network node. For example, UEs may be associated in a CoMP implementation with a wireless network node such as a base station even if not actively scheduled, such as by exchanging CSI or other information.

Alternately, or in addition, the CoMP information may include CQI information associated with one or more UEs scheduled by or associated with the first wireless network node. The low latency requirement may be associated with UE mobility. For example, low latency may correspond with a time rate in which CSI value do not change significantly (e.g., the UE has not moved sufficiently to affect the beamforming or other adjustment to mitigate interference). Alternately, or in addition, the CoMP information may include priority information associated with scheduled UEs.

The second set of backhaul information may include, for example, other backhaul information. The other backhaul information may include a second set of CoMP information. The second set of CoMP information may be information suitable for a high latency channel. The second set of CoMP information may be information requiring a high data throughput and/or high reliability transmission. The second set of backhaul information may be carried by a wired communications link in a licensed channel.

The first set of backhaul information may be sent, for example, as broadcast information in a broadcast transmission on the shared channel. The broadcast transmission may be provided from a macrocell base station to a plurality of femtocell base stations or other base stations. The broadcast information may include CoMP information. The CoMP information may include information associated with scheduling of one or more UEs served by the macrocell base station. The one or more UEs may be UEs within an interference range of one or more of the plurality of femtocell base stations. Alternately, or in addition, the broadcast information may include CSI and/or CQI information associated with the UEs.

The first set of backhaul information may be sent as a first point-to-point transmission between the first base station and the second base station on the shared channel. The first point-to-point transmission may include a first set of point-to-point information. The first point-to-point transmission may be provided from a macrocell base station to a first of a plurality of base stations. The plurality of base stations may be femtocell base stations, picocell base stations, and/or macrocell base stations.

The first point-to-point information may include, for example, CoMP information. The CoMP information may include information associated with scheduling of one or more UEs served by the macrocell base station. The one or more UEs may be UEs within an interference range of one or more of the plurality of base stations. Alternately, or in addition, the broadcast information may include CSI and/or CQI information associated with the UEs. Process 900 may further include sending a second point-to-point transmission to a second of the plurality of base stations. The second point-to-point transmission may include a third set of backhaul information. The second point-to-point transmission may be sent in a shared channel. The second point-to-point transmission may be in a different shared channel from the first point-to-point transmission.

The first set of point-to-point information may, for example, be associated with a UE served by the macro base station in proximity to the first of the plurality of base stations. The second point-to-point information may be associated with a UE served by the macro base station in proximity to the second of the plurality of base stations.

Figure 10:
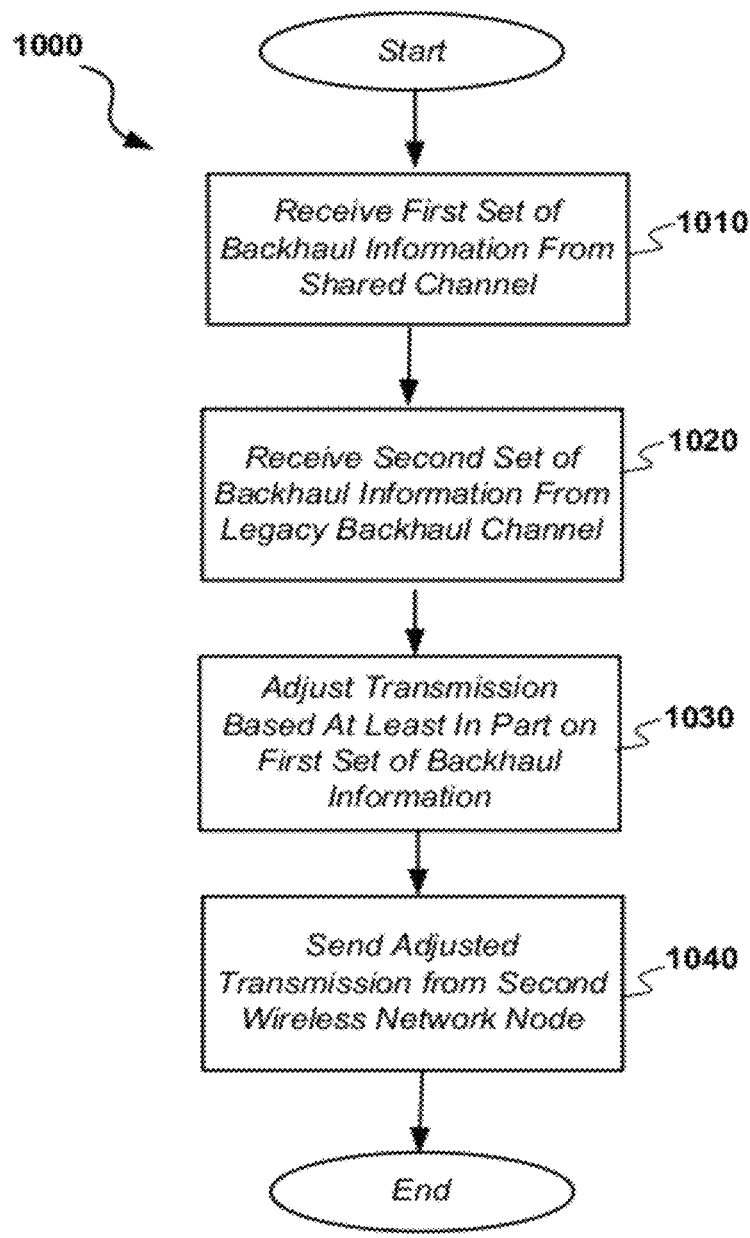
FIG. 10 illustrates a process for receiving certain backhaul information at a second network node provided from a first network node and controlling transmissions based on the information.

FIG. 10 illustrates details of an embodiment of a process 1000 for using backhaul communications in a wireless communication system provided on shared channels. At stage 1010, a first set of backhaul information provided by a first wireless network node on a first backhaul channel may be received at a second wireless network node. The first backhaul channel may be provided on a wireless shared channel. At stage 1020, a second set of backhaul information provided by the first wireless network node on a second backhaul channel may be received at the second wireless network node. The second wireless backhaul channel may be a legacy backhaul channel. At stage 1030, a transmission provided from the second wireless network node may be adjusted based at least in part on the received first set of backhaul information. The adjusted transmission may then be sent at stage 1040 from the second wireless network node. The transmission may be adjusted to mitigate interference from the second wireless network node to a UE served by the first wireless network node.

The first wireless network node and second wireless network nodes may be, for example, base stations. The base stations may be eNBs. The eNBs may be macrocell eNBs, femtocell eNBs, and/or picocell eNBs. The eNBs may be disposed in a heterogeneous network.

The legacy backhaul channel may be, for example, a licensed wireless channel, such as in a relay node implementation. Alternately, or in addition, the legacy backhaul channel may be a wired channel.

The shared channel may be, for example, a WS channel. The shared channel may be an ISM channel. The shared channel may be a shared licensed channel.

The stage 1030 of adjusting a transmission may include, for example, adjusting a transmission so as to mitigate interference to a UE served by the first wireless network node. The adjusting a transmission may includes beamforming a transmitted signal based at least in part on the first set of backhaul information. Alternately, or in addition, the adjusting may include changing user selection and/or scheduling. Alternately, or in addition, the adjusting may include adjusting scheduling by changing scheduling decisions such as, for example, rank, modulation and coding scheme (MCS), users, transmission timing, and/or other scheduling parameters. Alternately, or in addition, the adjusting a transmission may include adjusting transmission timing based at least in part on the first set of backhaul information. The first set of backhaul information may include information associated with the UE served by the first wireless network node.

The process 1000 may further include, for example, receiving a signal from a UE served by the first wireless network node. The process may further include adjusting the transmission at least in part based on information decoded from the received signal.

The first set of backhaul information may include, for example, information requiring a low-latency channel. The information requiring a low latency channel may be information associated with mitigating interference with a UE. The low latency may be required based on movement of the UE. The second set of backhaul information may include information suitable for a high-latency channel.

The first and second wireless nodes may be eNBs and the first set of backhaul information may include, for example, a first set of CoMP information usable for controlling the transmission provided from the second wireless channel. The CoMP information may include transmission scheduling information. The CoMP information may include CSI associated with one or more UEs scheduled by the first wireless network node. The CoMP information may include priority information associated with one or more UEs scheduled by the first wireless network node. The second set of backhaul information may include a second set of CoMP information. The first wireless network node may be a relay node and the second wireless node is a macro base station.

Figure 11:
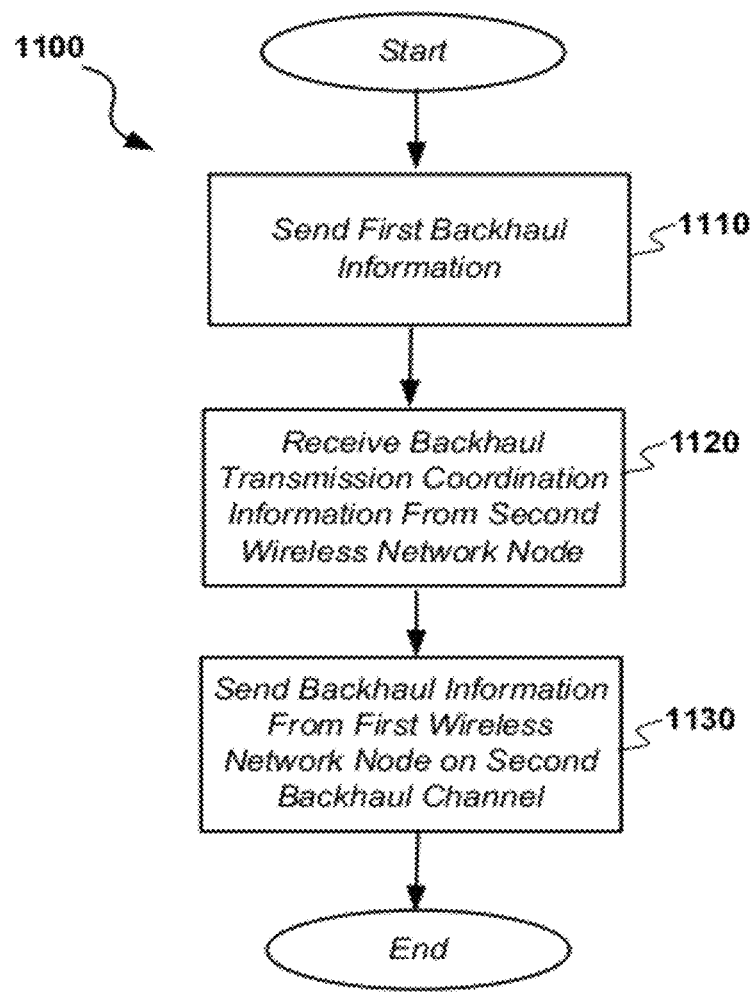
FIG. 11 illustrates a process for coordination backhaul communications between base stations.

FIG. 11 illustrates an embodiment of a process 1100 for coordination backhaul communications in a wireless communication system using shared channels. At stage 1110 first backhaul information may be sent from a first wireless node on a first backhaul channel established between the first wireless node and a second wireless node. At stage 1120 backhaul transmission coordination information may be received at the first wireless network node from the second wireless network node. At stage 1130 second backhaul information may be sent from the first wireless network node on a second backhaul channel established between the first wireless node and the second wireless node.

The process 1100 may further include, for example, selecting, based at least in part on the backhaul transmission coordination information, the second backhaul channel from among a plurality of shared channels. The selecting may include employing an interference avoidance procedure. The first backhaul channel may be a licensed wireless channel and the second backhaul channel may be an unlicensed wireless channel. The first backhaul channel may be carried by a wired communication link and the second backhaul channel may be an unlicensed wireless channel.

The stage 1120 of receiving may include, for example, receiving the backhaul transmission coordination information via the wired communication link. The transmission coordination may include at least one of CQI and CRC information.

In a typical startup or resynchronization procedure for using shared channels for backhaul communication, one or more nodes, such as femtocell nodes or other nodes, may be provided with information regarding use of shared channels for use in coordination from another node, such as a macrocell node. For example, a first cell base station, which may be, for example, a macrocell eNB, may be initially installed or resynchronized and may identify possible shared channels for use, such as by scanning, retrieving information from a database, etc. The first cell base station may either know or determine its location, and then inform other cells and associated base stations, which may be, for example, femtocells, of shared channels to be used for backhaul communications. Information may be provided initially from the first base station to other base stations using a legacy backhaul connection, such as an S1 connection or X2 connection, with subsequent backhaul communications provided on both legacy and shared channels such as described previously.

In some implementations, a base station using shared channels for wireless backhaul may periodically or asynchronously assess performance of legacy and shared channel backhaul to determine whether to switch operation from shared channel to legacy backhaul connections. For example, if a legacy backhaul channel is lightly loaded, operation on a shared channel, such as transmission of low latency information or other information as described previously, may be dynamically switched from the shared channel to the legacy channel. Alternately, if loading on the legacy channel increases (and/or latency increases to the point of impacting coordination between base stations and cells) operation may be dynamically switched from the legacy backhaul channel to a shared channel. This may be done as, for example, is described above, where the first base station determines suitable shared channels and signals other base stations over the legacy backhaul connection which shared channel or channels are to be used. Other information, such as timing, MCS information, physical layer signaling parameters, and/or other information may be provided to facilitate switchover of coordination from the legacy backhaul to shared channel backhaul.

Figure 12:
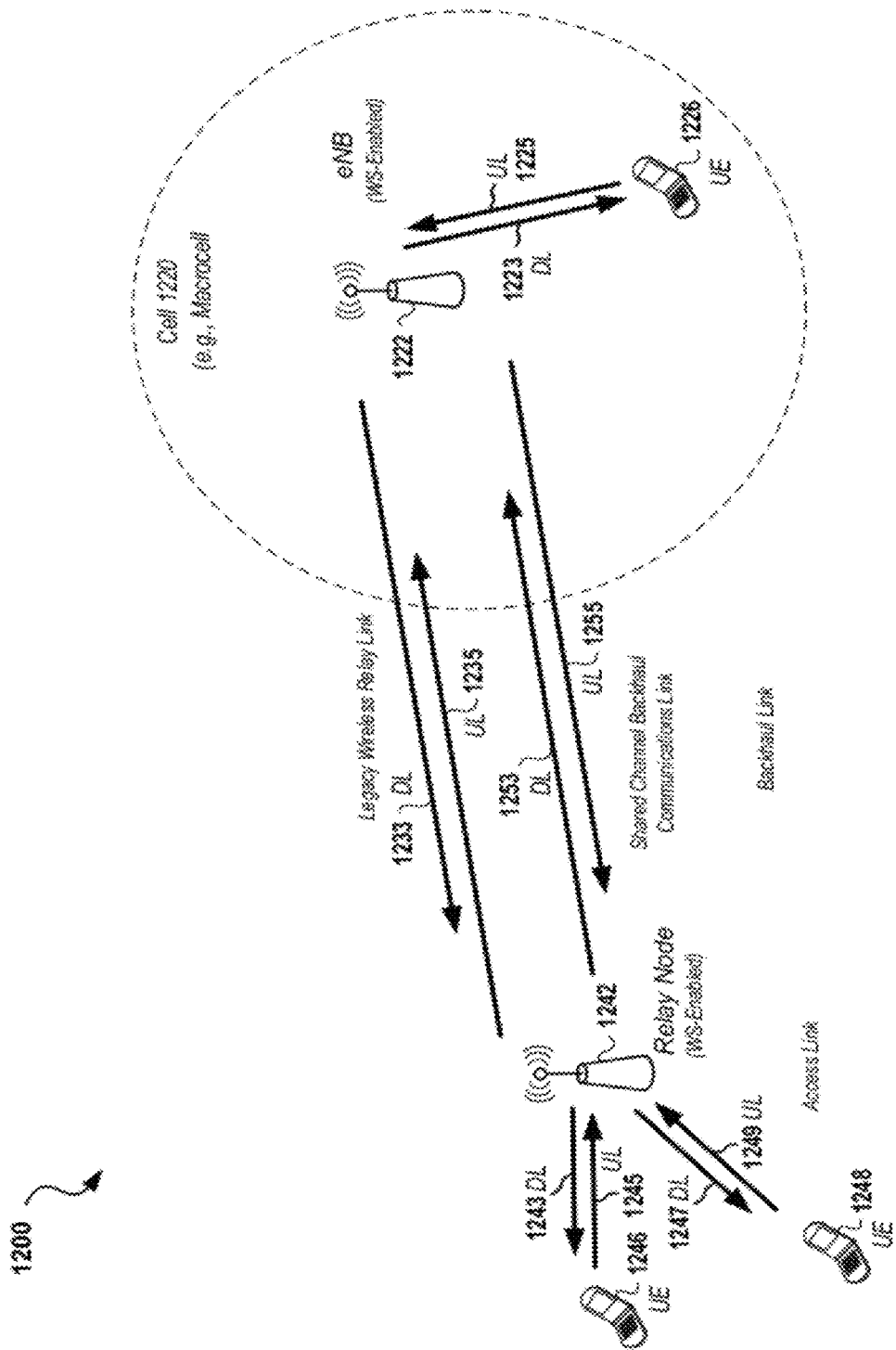
FIG. 12 illustrates a wireless communication system including a relay node.

FIG. 12 illustrates an embodiment of an alternate communication system configuration 1200 using a relay node, wherein similar functionality using shared channels may be provided. It is noted that the example configuration shown in FIG. 12 is provided for purposes of illustration and not limitation, and that aspects described herein may equally be used in other relay node configurations. Relay nodes have been defined in the LTE Specifications, and are also used in other communications systems to transfer or "repeat" signals to extend range, etc. In some applications, in-band relay configurations are used. In this case, channels are shared between two links (denoted as access link and backhaul link) in the same spectrum. The links must therefore be separate, such as by using time division depleting (TDD) or other multiplexing.

System 1200 includes a first base station 1222, which may be, for example, a macrocell eNB serving cell 1220. One or more UEs 1226, may be within the coverage area of base station 1222. These may be in communication with eNB 1222 using uplinks such as DL 1225, and downlinks such as DL 1223, which may be in licensed spectrum and/or in shared spectrum, such as in white space or other shared channels.

In order to extend the range of base station 1222, a relay node 1242 may be added to system 1200 to extend the range of base station 1222. Relay node 1242 may be configured similarly to the base stations previously illustrated herein, such as in FIGS. 4-8, and 10 as may include functionality as shown in the various UEs shown herein, such as UEs shown in FIGS. 4-8, and 10. Relay node 1242 may be in communication with base station 1222 via a downlink 1233 and an uplink 1235, which may be a legacy relay node wireless link such as defined in the LTE Specifications. The relay node may be in communication with one or more UEs, such as UEs 1246 and 1248 as shown in the example. These may communicate with the relay node 1242 using uplink and downlink connections in licensed (or shared, such as white space) channels, such as links 1243, 1245, 1247, and 1249.

However, as with base station to base station communications such as described previously herein, relay node configurations also need a backhaul connection, which is typically a wireless link, for bi-directional communication with the anchor cell (e.g., cell 1220 and associated base station 1222). These defined relay node connections may be denoted herein as legacy relay channels or links. Backhaul connections in relay node configurations are typically provided by partitioning the available licensed channel (legacy relay channel) and assigning some resources for the eNB-relay backhaul communications and all other resources for communications with UEs (e.g., in the in-band approach) on legacy wireless relay links 1233 and 1235.

In accordance with various aspects, if instead of using only a legacy relay channel, one or more additional shared channels, such as a white space, licensed shared channel, and/or other shared channel such as described previously herein is used in conjunction with the legacy wireless relay link, some backhaul communications between the relay node and anchor base station may be offloaded from the licensed wireless channel to the shared channel.

As shown in FIG. 12, downlink 1253 and/or uplink 1255 may be added on a shared channel or channels to supplement capacity on legacy links 1233 and 1235. As with the previously described examples in the context of base station to base station communications, the legacy link 1233/1235 may have a relatively high latency, whereas the shared channel link 1253/1255 may have a relatively low latency (and/or relatively low capacity). In an exemplary embodiment, legacy links 1233 and 1235 may be used primarily for backhaul signaling suitable for a high latency connection (e.g., on the order of 40 mS), such as for establishing connections, maintaining connections, changing channels, and the like. Shared channel links 1253/1255 may provide a lower latency connection (e.g., on the order of 1-10 mS in one example) and may be capable of carrying a higher amount of data than legacy wireless connection. However, as with the previous base station to base station example, shared channel links 1253 and 1255 will generally be less reliable due to the possibility of interference caused by other users, as well as channel conditions, propagation conditions, etc. However, if shared channels are available and of acceptable quality for links 1253 and/or 1255, data may be offloaded from legacy channels 1233 and 1235 to the shared channels.

In order to establish communications on the shared channel between a relay node and an associated base station, a protocol may be used to establish connection with information on the shared channel or channels used, periodical channel assessment, as well as other link-related functions. In an exemplary embodiment, the base station may control selection and monitoring of the shared channels and may provide information to the relay to facilitate operation. For example, a status report may be periodically collected by the base station from one or more relays. If a shared channel's quality is decreasing, the base station may search for or otherwise identify the new channel and then coordinate with the relay node to switch operation. Alternately, if no alternate channel is identified, operation may return solely to the legacy backhaul wireless channel or channels.

In an exemplary embodiment, the legacy channel may be used to carry control plane information and possibly some data traffic. The remaining data may then be put into white space, which may include data such as CSI information, white space establishment and maintenance, etc as well as radio bearer data. In this way, overall capacity may be increased in the system. For example, in one implementation, the shared channel or channels may be loaded to capacity with data so as to offload information from the legacy channel. Since the shared channel will generally be less reliable for reasons such as described previously including interference from other users, etc, channel conditions of the wireless and shared channel may be monitored and operation switched between the shared channel and licensed wireless channel if needed.

Figure 13:
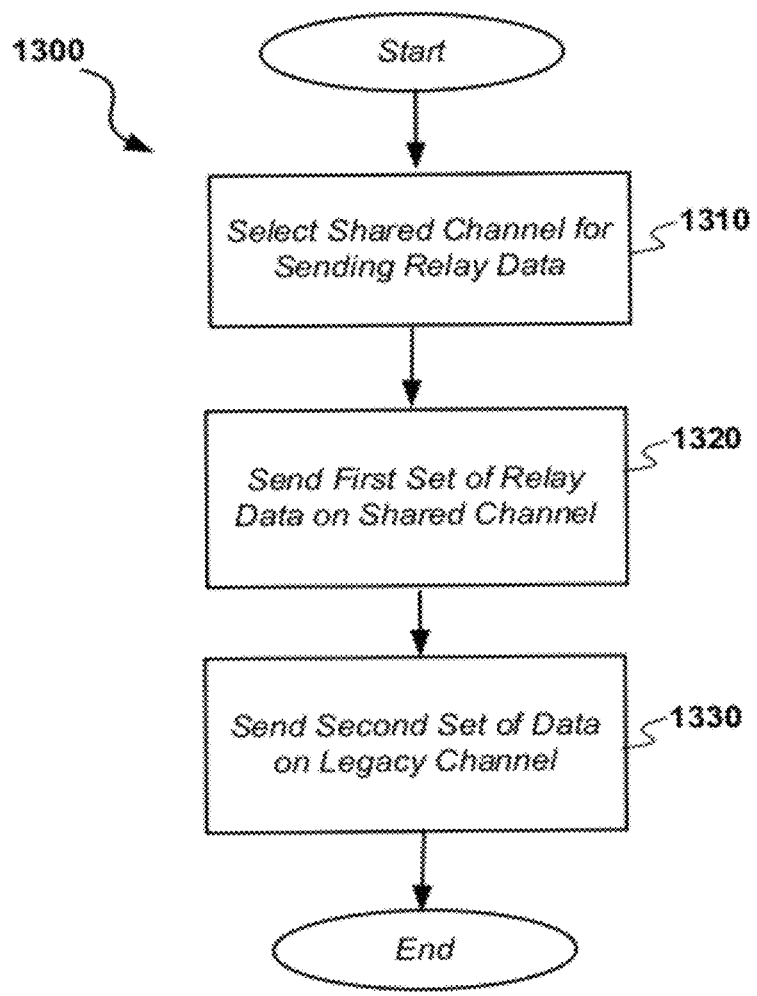
FIG. 13 illustrates a process for providing backhaul information with a relay node using shared channels.

Attention is now directed to FIG. 13, which illustrates details of a process 1300 for providing backhaul communications using a shared channel with a relay node in a communications system. At stage 1310, a shared channel may be selected for use as a first channel between a base station and a relay node. At stage 1320, a first set of information may be sent on the first channel from the base station to the relay node. At stage 1330, a second set of information may be sent from the base station to the relay node on a legacy wireless channel.

The first base station may be, for example, a macrocell base station. The macrocell base station may be an eNB. The first set of information may include relay node backhaul information. The backhaul information may include information associated with the shared channel link. The backhaul information may include information associated with monitoring of the shared channel link. The first set of information may include relay node control information. The first set of information may include relay node radio bearer data. The legacy wireless channel may be used for both access link and backhaul link transmissions. This may be done by, for example, partitioning resources.

The shared channel may be, for example, a white space channel. The shared channel may be an ISM channel. The shared channel may be a shared licensed channel. The shared channel may be an ASM channel or other shared channel.

The selecting a shared channel may include searching a set of shared channels for one or more primary users and selecting the shared channel from the set of shared channels based at least in part on absence of a primary user. The selecting a shared channel may include accessing a database of channel information and selecting the shared channel based at least in part on information retrieved from the database. The shared channel may be selected at least in part based on a signal metric associated with the shared channel. The signal metric may be a signal-to-interference ratio metric.

The first set of information may include, for example, information requiring a low-latency channel and the second set of backhaul information comprises information suitable for a high-latency channel. The first set of information may include information requiring a high data rate channel.

The process 1300 may further include, for example, receiving, from the relay node, a third set of information on the shared channel. The method may further include receiving, from the relay node, a fourth set of information on the legacy wireless channel.

Figure 14:
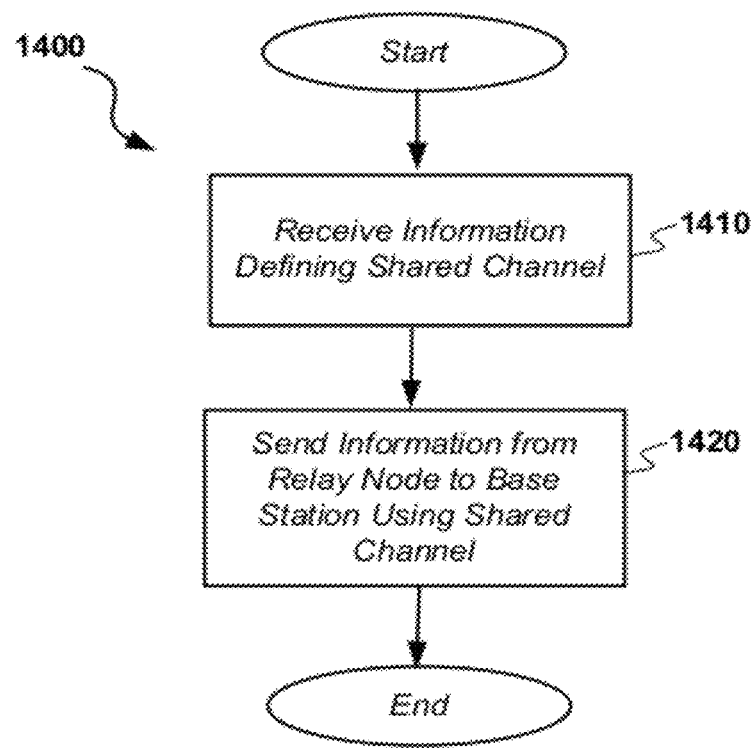
FIG. 14 illustrates a process for providing backhaul information from a relay node using shared channels.

Attention is now directed to FIG. 14, which illustrates details of a process 1400 for providing backhaul communications from relay nodes in a wireless communication system. At stage 1410, information defining a shared channel to be used to communicate information may be received at a relay node, such as relay node 1246 as shown in FIG. 12. The information may be provided from a base station such as base station 1222 as shown in FIG. 12. The method may further include sending, from the relay node to the base station, a first set of information on the shared channel.

The first set of information may include, for example, relay node backhaul information. Alternately, or in addition, the first set of information may include relay node control information. Alternately, or in addition, the first set of information may include relay node radio bearer data.

The shared channel may be, for example, a white space channel. The shared channel may be an ISM channel. The shared channel may be a shared licensed channel or other shared channel.

The first set of information may include, for example, information requiring a low-latency channel. The second set of information may include information suitable for a high-latency channel. The first set of information may include information requiring a high data rate channel.

The process 1400 may further include sending, from the relay node to a UE, at least a portion of the first information. The portion of the first information may include radio bearer data intended for distribution to the UE.

The process 1400 may further include receiving data from the UE. The process 1400 may further include providing at least a portion of the information received from the UE to the base station using the shared channel.

Figure 15:
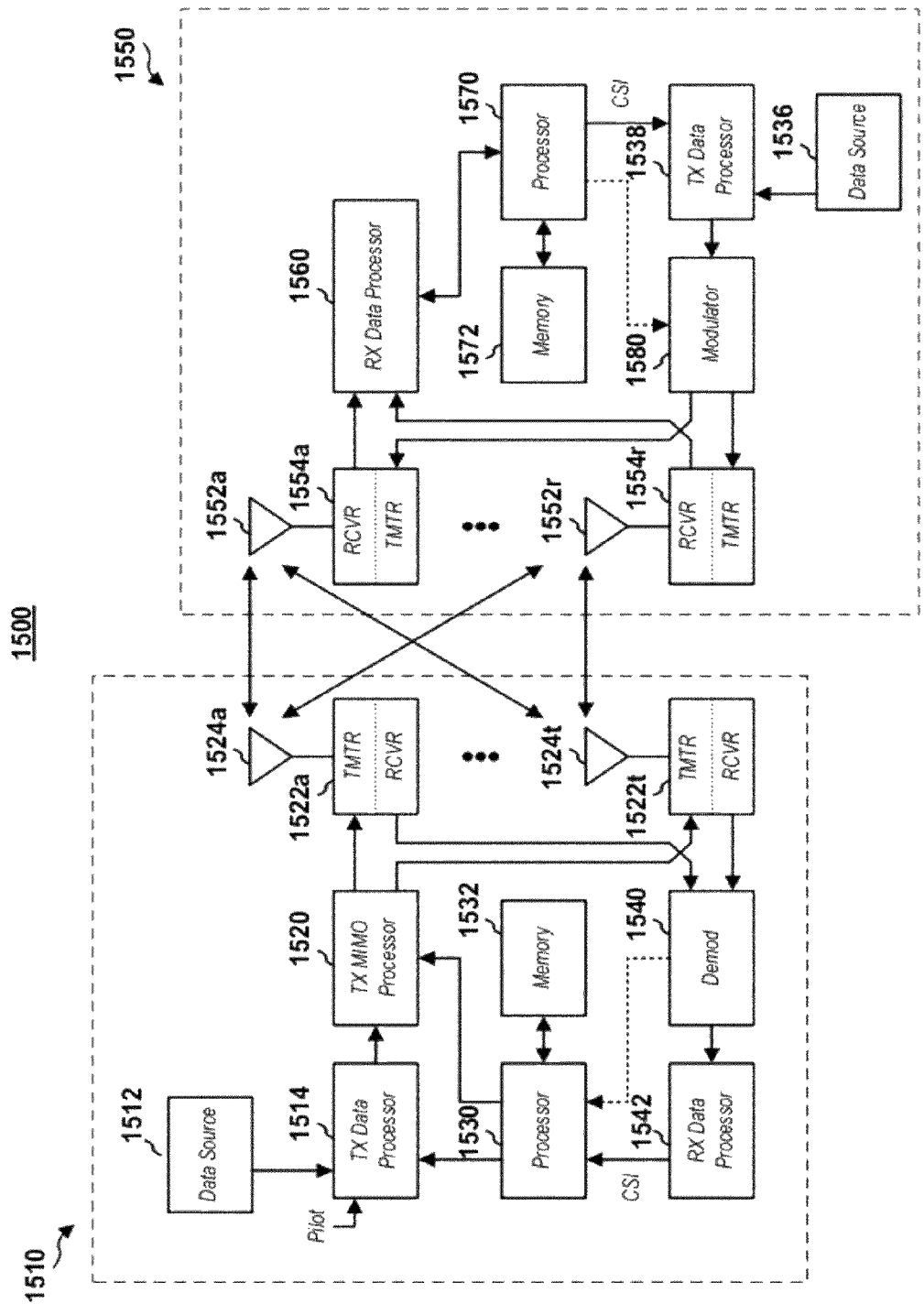
FIG. 15 illustrates a transmitter system and a receiver system.

Attention is now directed to FIG. 15, which illustrates a system 1500 including a transmitter system 1510 (which may be a base station or eNB) and a receiver system 1550 (which may be a UE) in an LTE MIMO system 1500. At the transmitter system 1510, traffic data for a number of data streams is provided from a data source 1512 to a transmit (TX) data processor 1514. Each data stream is transmitted over a respective transmit antenna. TX data processor 1514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1530.

The modulation symbols for all data streams are then provided to a TX MIMO processor 1520, which may further process the modulation symbols (e.g., for OFDM). TX MIMO processor 1520 then provides $N_T$ modulation symbol streams to $N_T$ transmitters (TMTR) 1522a through 1522t. In certain embodiments, TX MIMO processor 1520 applies beam-forming weights to the symbols of the data streams and to the antenna from which the symbol is being transmitted.

Each transmitter 1522 receives and processes a respective symbol stream to provide one or more analog signals, and further conditions (e.g., amplifies, filters, and up-converts) the analog signals to provide a modulated signal suitable for transmission over the MIMO channel. $N_T$ modulated signals from transmitters 1522a through 1522t are then transmitted from $N_T$ antennas 1524a through 1524t, respectively.

At receiver system 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and down-converts) a respective received signal, digitizes the conditioned signal to provide samples, and further processes the samples to provide a corresponding "received" symbol stream.

An RX data processor 1560 then receives and processes the NR received symbol streams from $N_R$ receivers 1554 based on a particular receiver processing technique to provide $N_T$ "detected" symbol streams. The RX data processor 1560 then demodulates, de-interleaves, and decodes each detected symbol stream to recover the traffic data for the data stream. The processing by RX data processor 1560 is complementary to that performed by TX MIMO processor 1520 and TX data processor 1514 at transmitter system 1510.

A processor 1570 periodically determines which pre-coding matrix to use. Processor 1570 formulates a reverse link message comprising a matrix index portion and a rank value portion. The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by transmitters 1554a through 1554r, and transmitted back to transmitter system 1510.

At transmitter system 1510, the modulated signals from receiver system 1550 are received by antennas 1524, conditioned by receivers 1522, demodulated by a demodulator 1540, and processed by a RX data processor 1542 to extract the reserve link message transmitted by the receiver system 1550. Processor 1530 then determines which pre-coding matrix to use for determining the beam-forming weights then processes the extracted message. The various components as illustrated in transmit and receive sub-systems 1510 and 1520 may be further configured to communicate via shared channels which may be done by, for example, using signaling similar to that used on licensed channels in LTE systems. Alternately, signaling may be done on shared channels using other signaling suitable for shared channel transmissions, such as different modulation and coding schemes. In some implementations, elements as shown in FIG. 15 may be used in separate base stations to provide the shared channel backhaul communication functionality described herein. In addition, legacy backhaul communications may be provided from components as shown in FIG. 15 (in the case of wireless legacy backhaul links) and/or with other components not shown (such as wired legacy communication components).

In some configurations, the apparatus for wireless communication includes means for performing various functions as described herein. In one aspect, the aforementioned means may be a module including a processor or processors and associated memory in which embodiments of the invention reside, such as are shown in FIG. 4-8, 13, or 15, and which are configured to perform the functions recited by the aforementioned means. The may be, for example, modules or apparatus residing in eNBs and/or other network devices such as are shown and/or described herein. In another aspect, the aforementioned means may be a module or apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a UE. In the alternative, the processor and the storage medium may reside as discrete components in a UE.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

We claim:

1. A method for wireless communication, comprising:
   selecting a shared channel for use as a first backhaul channel for a first point-to-point connection having a first time interval for transmitting first control information suitable for the first backhaul channel between a first wireless node and a second wireless node, the shared channel being selected based at least in part on an absence of a primary user on a set of shared channels, primary user information provided by a database, a signal metric of the shared channel, or a combination thereof;
   sending, from the first wireless node, the first control information via the first backhaul channel;

determining a second backhaul channel established as a second point-to-point connection having a second time interval that is greater than the first time interval for transmitting second control information suitable for the second backhaul channel between the first wireless node and the second wireless node; and sending, from the first wireless node, the second control information via the second backhaul channel, the first control information and the second control information being used to coordinate transmission of the first wireless node and the second wireless node.

2. The method of claim 1, wherein the shared channel includes a White Space (WS) channel, an Instrumentation, Scientific, and Measurement (ISM) channel or a shared licensed channel.

3. The method of claim 1, further comprising searching the set of shared channels for the primary user.

4. The method of claim 1, further comprising accessing the database.

5. The method of claim 1, wherein the signal metric includes a signal-to-interference ratio metric.

6. The method of claim 1, wherein the second backhaul channel is carried by a wired communications link.

7. The method of claim 1, wherein the second backhaul channel is a licensed wireless channel.

8. The method of claim 1, wherein the first and second wireless nodes are evolved Node Bs (eNBs) and the first control information includes a first set of coordinated multipoint (CoMP) information usable for coordinating transmission of the first and second wireless nodes.

9. The method of claim 8, wherein the CoMP information includes transmission scheduling information.

10. The method of claim 8, wherein the CoMP information includes channel state information (CSI) associated with at least one user equipment (UE) scheduled by the first wireless node or associated with the first wireless node.

11. The method of claim 8, wherein the CoMP information includes priority information associated with at least one user equipment (UE) scheduled by the first wireless node or associated with the first wireless node.

12. The method of claim 8, wherein the second control information includes a second set of CoMP information.

13. The method of claim 1, wherein the sending the first control information includes sending the first control information on the shared channel using a modulation and coding scheme (MCS) having a spectral efficiency below a first threshold and an energy efficiency above a second threshold.

14. The method of claim 1, wherein the first wireless node is a relay node and the second wireless node is a base station.

15. The method of claim 1, wherein the sending the first control information includes sending the first control information as a broadcast transmission on the shared channel.

16. The method of claim 1, further comprising sending, from the first wireless node, third control information via a third point-to-point connection to a third wireless node.

17. A non-transitory computer-readable medium including instructions stored thereon, comprising:

instructions for causing a computer to select a shared channel for use as a first backhaul channel for a first point-to-point connection having a first time interval for transmitting first control information suitable for the first backhaul channel between a first wireless node and a second wireless node, the shared channel being selected based at least in part on an absence of a primary user on a set of shared channels, primary user information provided by a database, a signal metric of the shared channel, or a combination thereof;

instructions for causing the computer to send, from the first wireless node, the first control information via the first backhaul channel;

instructions for causing the computer to determine a second backhaul channel established as a second point-to-point connection having a second time interval that is greater than the first time interval for transmitting second control information suitable for the second backhaul channel between the first wireless node and the second wireless node; and instructions for causing the computer to send, from the first wireless node, the second control information via the second backhaul channel, the first control information and the second control information being used to coordinate transmission of the first wireless node and the second wireless node.

18. The non-transitory computer-readable medium of claim 17, further comprising instructions for causing the computer to search the set of shared channels for a primary user.

19. The non-transitory computer-readable medium of claim 17, further comprising instructions for causing the computer to access the database.

20. The non-transitory computer-readable medium of claim 17, wherein the signal metric includes a signal-to-interference ratio metric.

21. The non-transitory computer-readable medium of claim 17, wherein the second backhaul channel is a wired communication link or a licensed wireless channel.

22. The non-transitory computer-readable medium of claim 17, wherein the first and second wireless nodes are evolved Node Bs (eNBs) and the first control information includes a first set of coordinated multipoint (CoMP) information usable for coordinating transmission of the first and second wireless nodes.

23. The non-transitory computer-readable medium of claim 22, wherein the CoMP information includes at least one of:

transmission scheduling information;

channel state information (CSI) associated with at least one user equipment (UE) scheduled by the first wireless node or associated with the first wireless node; or priority information associated with at least one user equipment (UE) scheduled by the first wireless node or associated with the first wireless node.

24. An apparatus for wireless communication, comprising:
at least one processor configured to:

select a shared channel for use as a first backhaul channel for a first point-to-point connection having a first time interval for transmitting first control information suitable for the first backhaul channel between a first wireless node and a second wireless node, the shared channel being selected based at least in part on an absence of a primary user on a set of shared channels, primary user information provided by a database, a signal metric of the shared channel, or a combination thereof;

send, from the first wireless node, the first control information via the first backhaul channel;

determine a second backhaul channel established as a second point-to-point connection having a second time interval that is greater than the first time interval for transmitting second control information suitable for the second backhaul channel between the first wireless node and the second wireless node; and send, from the first wireless node, the second control information via the second backhaul channel, the first control information and the second control information being used to coordinate transmission of the first wireless node and the second wireless node; and memory coupled to the at least one processor.

25. The apparatus of claim 24, wherein the shared channel includes a White Space (WS) channel, an Instrumentation, Scientific, or Measurement (ISM) channel and a shared licensed channel.

26. The apparatus of claim 24, wherein the at least one processor is further configured to search the set of shared channels for the primary user.

27. The apparatus of claim 24, wherein the at least one processor is further configured to access the database.

28. The apparatus of claim 24, wherein the signal metric includes a signal-to-interference ratio metric.

29. The apparatus of claim 24, wherein the second backhaul channel is a wired communications link or a licensed wireless channel.

30. The apparatus of claim 24, wherein the first and second wireless nodes are evolved Node Bs (eNBs) and the first control information includes a first set of coordinated multipoint (CoMP) information usable for coordinating transmission of the first and second wireless nodes.

31. The apparatus of claim 30, wherein the CoMP information includes at least one of:
transmission scheduling information;
channel state information (CSI) associated with at least one user equipment (UE) scheduled by the first wireless node or associated with the first wireless node; or
priority information associated with at least one user equipment (UE) scheduled by the first wireless node or associated with the first wireless node.

32. An apparatus for wireless communication, comprising:
means for selecting a shared channel for use as a first backhaul channel for a first point-to-point connection having a first time interval for transmitting first control information suitable for the first backhaul channel between a first wireless node and a second wireless node, the shared channel being selected based at least in part on an absence of a primary user on a set of shared channels, primary user information provided by a database, a signal metric of the shared channel, or a combination thereof;
means for sending, from the first wireless node, the first control information via the first backhaul channel;
means for determining a second backhaul channel established as a second point-to-point connection having a second time interval that is greater than the first time interval for transmitting second control information suitable for the second backhaul channel between the first wireless node and the second wireless node; and
means for sending, from the first wireless node, the second control information via the second backhaul channel, the first control information and the second control information being used to coordinate transmission of the first wireless node and the second wireless node.

33. The apparatus of claim 32, further comprising means for searching the set of shared channels for a primary user.

34. The apparatus of claim 32, wherein the shared channel includes a White Space (WS) channel, an Instrumentation, Scientific, and Measurement (ISM) channel or a shared licensed channel.

35. A method for wireless communication, comprising:
receiving, at a second wireless node, first control information via a first backhaul channel established as a first point-to-point connection having a first time interval for transmitting the first control information suitable for the first backhaul channel between a first wireless node and the second wireless node, the first backhaul channel being provided on a shared channel, the shared channel being selected based at least in part on an absence of a primary user on a set of shared channels, primary user information provided by a database, a signal metric of the shared channel, or a combination thereof; and
receiving, at the second wireless node, second control information via a second backhaul channel established as a second point-to-point connection having a second time interval that is greater than the first time interval for transmitting the second control information suitable for the second backhaul channel between the first wireless node and the second wireless node, the second backhaul channel being a legacy backhaul channel, and the first control information-and the second control information being used to coordinate transmission of the first wireless node and the second wireless node.

36. The method of claim 35, wherein the legacy backhaul channel includes a licensed wireless channel or a wired channel; and
wherein the shared channel includes a White Space (WS) channel, an Instrumentation, Scientific, and Measurement (ISM) channel or a shared licensed channel.

37. The method of claim 35, further comprising adjusting a transmission from a second wireless node by at least:
beamforming a transmitted signal based at least in part on the first control information;
adjusting transmission scheduling based at least in part on the first control information; or
a combination thereof.

38. The method of claim 35, further comprising receiving a signal from a user equipment (UE) served by the first wireless node and adjusting the transmission based at least in part on information decoded from the received signal.

39. The method of claim 35, wherein the first and second wireless nodes are evolved node Bs (eNBs) and the first control information includes a first set of coordinated multipoint (CoMP) information usable for controlling the transmission of the second wireless node.

40. The method of claim 39, wherein the CoMP information includes transmission scheduling information.

41. The method of claim 39, wherein the CoMP information includes channel state information (CSI) associated with at least one user equipment (UE) scheduled by the first wireless node or associated with the first wireless node.

42. The method of claim 39, wherein the CoMP information includes priority information associated with at least one user equipment (UE) scheduled by the first wireless node or associated with the first wireless node.

43. The method of claim 39, wherein the second control information includes a second set of CoMP information.

44. The method of claim 35, wherein the first wireless node is a relay node and the second wireless node is a base station.

45. The non-transitory computer-readable medium of claim 44, further comprising instructions for causing the computer to adjust a transmission from a second wireless node by at least one of:
beamforming a transmitted signal based at least in part on the first control information;
adjusting transmission scheduling based at least in part on the first control information; or
a combination thereof.

46. The non-transitory computer-readable medium of claim 44, further comprising code for causing the computer to receive a signal from a user equipment (UE) served by the first wireless node and adjust the transmission based at least in part on information decoded from the received signal.

47. The non-transitory computer-readable medium of claim 44, wherein the first and second wireless nodes are evolved node Bs (eNBs) and the first control information includes a first set of coordinated multipoint (CoMP) information usable for controlling the transmission of the second wireless node.

48. The non-transitory computer-readable medium of claim 47, wherein the CoMP information includes at least one of:
transmission scheduling information;
channel state information (CSI) associated with at least one user equipment (UE) scheduled by the first wireless node or associated with the first wireless node; or
priority information associated with at least one user equipment (UE) scheduled by the first wireless node or associated with the first wireless node.

49. The non-transitory computer-readable medium of claim 44, wherein the second control information includes a second set of CoMP information.

50. The non-transitory computer-readable medium of claim 44, wherein the first wireless node is a relay node and the second wireless node is a base station.

51. A non-transitory computer-readable medium including instructions stored thereon, comprising:
instructions for causing a computer to receive, at a second wireless node, first control information via a first backhaul channel established as a first point-to-point connection having a first time interval for transmitting the first control information suitable for the first backhaul channel between a first wireless node and the second wireless node, the first backhaul channel being provided on a shared channel, the shared channel being selected based at least in part on an absence of a primary user on a set of shared channels, primary user information provided by a database, a signal metric of the shared channel, or a combination thereof; and
instructions for causing the computer to receive, at the second wireless node, second control information via a second backhaul channel established as a second point-to-point connection having a second time interval that is greater than the first time interval for transmitting the second control information suitable for the second backhaul channel between the first wireless node and the second wireless node, the second wireless backhaul channel being a legacy backhaul channel, and the first control information and the second control information being used to coordinate transmission of the first wireless node and the second wireless node.

52. The non-transitory computer-readable medium of claim 51, wherein the legacy backhaul channel includes a licensed wireless channel or a wired channel; and
wherein the shared channel includes a White Space (WS) channel, an Instrumentation, Scientific, and Measurement (ISM) channel or a shared licensed channel.

53. An apparatus for wireless communication, comprising:
at least one processor configured to:
receive, at a second wireless node, first control information via a first backhaul channel established as a first point-to-point connection having a first time interval for transmitting the first control information suitable for the first backhaul channel between a first wireless node and the second wireless node, the first backhaul channel being provided on a shared channel, the shared channel being selected based at least in part on an absence of a primary user on a set of shared channels, primary user information provided by a database, a signal metric of the shared channel, or a combination thereof; and
receive, at the second wireless node, second control information via a second backhaul channel established as a second point-to-point connection having a second time interval that is greater than the first time interval for transmitting the second control information suitable for the second backhaul channel between the first wireless node and the second wireless node, the second wireless backhaul channel being a legacy backhaul channel, and the first control information and the second control information being used to coordinate transmission of the first wireless node and the second wireless node; and
memory coupled to the at least one processor.

54. The apparatus of 53, wherein the legacy backhaul channel includes a licensed wireless channel or a wired channel; and
wherein the shared channel includes a White Space (WS) channel, an Instrumentation, Scientific, and Measurement (ISM) channel or a shared licensed channel.

55. The apparatus of 53, wherein the at least one processor is further configured to adjust a transmission from a second wireless node by at least one of:
beamforming a transmitted signal based at least in part on the first control information;
adjusting transmission scheduling based at least in part on the first control information; or
a combination thereof.

56. The apparatus of 53, wherein the at least one process is further configured to receive a signal from a user equipment (UE) served by the first wireless node and adjust the transmission based at least in part on information decoded from the received signal.

57. The apparatus of 53, wherein the first and second wireless nodes are evolved node Bs (eNBs) and the first control information includes a first set of coordinated multipoint (CoMP) information usable for controlling the transmission of the second wireless node.

58. The apparatus of 57, wherein the CoMP information includes at least one of:
transmission scheduling information;
channel state information (CSI) associated with at least one user equipment (UE) scheduled by the first wireless node or associated with the first wireless node; or
priority information associated with at least one user equipment (UE) scheduled by the first wireless node or associated with the first wireless node.

59. The apparatus of 53, wherein the second control information includes a second set of CoMP information.

60. The apparatus of 53, wherein the first wireless node is a relay node and the second wireless node is a base station.

61. An apparatus for wireless communication, comprising:
means for receiving, at a second wireless node, first control information via a first backhaul channel established as a first point-to-point connection having a first time interval for transmitting the first control information suitable for the first backhaul channel between a first wireless node and the second wireless node, the first backhaul channel being provided on a shared channel, the shared channel being selected based at least in part on an absence of a primary user on a set of shared channels, primary user information provided by a database, a signal metric of the shared channel, or a combination thereof; and means for receiving, at the second wireless node, second control information via a second backhaul channel established as a second point-to-point connection having a second time interval that is greater than the first time interval for transmitting the second control information suitable for the second backhaul channel between the first wireless node and the second wireless node, the second wireless backhaul channel being a legacy backhaul channel, and the first control information and the second control information being used to coordinate transmission of the first wireless node and the second wireless node.

62. The apparatus of claim 61, wherein the legacy backhaul channel includes a licensed wireless channel or a wired channel; and wherein the shared channel includes a White Space (WS) channel, an Instrumentation, Scientific, and Measurement (ISM) channel or a shared licensed channel.

* * * * *